US010736113B2

(12) United States Patent
Wang et al.

(10) Patent No.: US 10,736,113 B2
(45) Date of Patent: Aug. 4, 2020

(54) POSITIONING SIGNAL TECHNIQUES FOR NARROWBAND DEVICES

(71) Applicant: QUALCOMM Incorporated, San Diego, CA (US)

(72) Inventors: Renqiu Wang, San Diego, CA (US); Hao Xu, San Diego, CA (US); Wanshi Chen, San Diego, CA (US); Xiao feng Wang, San Diego, CA (US); Peter Gaal, San Diego, CA (US); Juan Montojo, San Diego, CA (US); Alberto Rico Alvarino, San Diego, CA (US); Jing Lei, San Diego, CA (US); Seyed Ali Akbar Fakoorian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/424,519

(22) Filed: Feb. 3, 2017

(65) Prior Publication Data
US 2017/0238298 A1 Aug. 17, 2017

Related U.S. Application Data

(60) Provisional application No. 62/296,037, filed on Feb. 16, 2016.

(51) Int. Cl.
*H04W 72/04* (2009.01)
*H04L 27/26* (2006.01)
(Continued)

(52) U.S. Cl.
CPC ......... *H04W 72/048* (2013.01); *G01S 5/0236* (2013.01); *G01S 5/0252* (2013.01);
(Continued)

(58) Field of Classification Search
CPC ............. H04W 72/048; H04W 72/005; H04W 72/042; H04W 72/1268; H04W 56/001;
(Continued)

(56) References Cited

U.S. PATENT DOCUMENTS

2011/0039574 A1* 2/2011 Charbit ................. G01S 5/0215
455/456.1
2011/0176499 A1* 7/2011 Siomina .................. G01S 1/042
370/329

(Continued)

FOREIGN PATENT DOCUMENTS

WO WO-2017029213 A1 2/2017

OTHER PUBLICATIONS

Ericsson, "Text Proposal and Discussion on Further Enhancements for OTDOA," 3GPP TSG RAN WG1 Meeting #82, R1-153744, Beijing, China, Aug. 24-28, 2015, 9 pgs., XP051001192, 3rd Generation Partnership Project.

(Continued)

Primary Examiner — Mong-Thuy T Tran
(74) Attorney, Agent, or Firm — Holland & Hart LLP

(57) ABSTRACT

Methods, systems, and devices for wireless communication are described. A user equipment (UE) and a base station may establish narrowband communications. The base station may configure positioning reference signal (PRS) resources based at least in part on wideband or narrowband transmissions, and a UE may receive the PRS transmissions over one or more narrowband regions. The UE, may determine PRS resources and receive portions of wideband PRS transmissions that are transmitted in one or more narrowband regions of the system bandwidth. The base station may configure PRS resources separately for narrowband devices, such as according to a bandwidth of the narrowband devices or with a single PRS tone per symbol compared to two PRS tones (Continued)

per symbol that may be used for wideband PRS transmissions. The base station may perform positioning measurements for a UE based at least in part on timing of uplink transmissions from the UE.

35 Claims, 22 Drawing Sheets

(51) Int. Cl.
*H04L 5/00* (2006.01)
*G01S 5/02* (2010.01)
*H04W 56/00* (2009.01)
*H04W 72/00* (2009.01)
*H04W 72/12* (2009.01)

(52) U.S. Cl.
CPC ............ *H04L 5/005* (2013.01); *H04L 5/0048* (2013.01); *H04L 27/2662* (2013.01); *H04W 56/001* (2013.01); *H04W 72/005* (2013.01); *H04W 72/042* (2013.01); *H04W 72/1268* (2013.01); *H04L 5/0012* (2013.01); *H04L 27/2607* (2013.01)

(58) Field of Classification Search
CPC ... G01S 5/0252; G01S 5/0236; H04L 5/0048; H04L 5/005; H04L 5/0012; H04L 27/2662; H04L 27/2607
USPC ....................................................... 455/452.1
See application file for complete search history.

(56) References Cited

U.S. PATENT DOCUMENTS

| | | | |
|---|---|---|---|
| 2012/0027110 A1* | 2/2012 | Han | H04J 11/0079 375/260 |
| 2012/0093101 A1* | 4/2012 | Dai | H04L 5/0048 370/329 |
| 2012/0165053 A1* | 6/2012 | Yoon | H04L 5/0048 455/501 |
| 2012/0302254 A1 | 11/2012 | Charbit et al. | |
| 2013/0308567 A1* | 11/2013 | Chen | H04L 5/005 370/329 |
| 2014/0112261 A1* | 4/2014 | Chen | H04B 7/2656 370/329 |
| 2014/0141792 A1* | 5/2014 | Larsson | H04W 64/00 455/452.1 |
| 2014/0301305 A1* | 10/2014 | Xu | H04W 72/04 370/329 |
| 2014/0302784 A1 | 10/2014 | Kim et al. | |
| 2015/0208269 A1* | 7/2015 | Damnjanovic | H04L 1/0023 370/252 |
| 2015/0333880 A1* | 11/2015 | Yi | H04L 5/001 370/329 |
| 2017/0289831 A1* | 10/2017 | Park | G01S 5/02 |
| 2017/0289973 A1* | 10/2017 | Yang | H04W 72/042 |
| 2017/0311232 A1* | 10/2017 | Yi | H04W 48/12 |
| 2017/0366244 A1* | 12/2017 | Lee | H04W 24/10 |
| 2018/0324017 A1* | 11/2018 | Liu | H04L 5/0053 |
| 2019/0007923 A1* | 1/2019 | Blankenship | H04L 5/0048 |
| 2019/0029005 A1* | 1/2019 | Bendlin | H04L 5/0053 |

OTHER PUBLICATIONS

NEC Group, "Correction to EPDCCH Monitoring," 3GPP TSG-RAN WG1 Meeting #72bis, R1-131257, Chicago, IL, Apr. 15-20, 2013, 10 pgs., XP050696793, 3rd Generation Partnership Project.
ISA/EPO, Partial International Search Report of the International Searching Authority, Int'l. App. No. PCT/US2017/016642, dated May 29, 2017, European Patent Office, Rijswijk, NL, 14 pgs.
ZTE, "Remaining Issues on Multiplexing of Downlink Channels for NB-IoT," 3GPP TSG RAN WG1 Meeting #84, R1-160468, St. Julian's, Malta, Feb. 15-19, 2016, 4 pgs., XP051053801, 3rd Generation Partnership Project.
3GPP, "3rd Generation Partnership Project; Technical Specification Group Radio Access Network; Study on Indoor Positioning Enhancements for UTRA and LTE (Release 13)", 3GPP Technical Report, Dec. 2015, 82 pgs., 3GPP TR 37.857, No. V13.1.0, XP051063636, 3rd Generation Partnership Project, Sophia-Antipolis Valbonne, France.
ISA/EP, International Search Report and Written Opinion of the International Searching Authority, Int'l Application No. PCT/US2017/016642, dated Aug. 24, 2017, European Patent Office, Rijswijk, NL, 23 pgs.
QUALCOMM Incorporated, "Evaluation Results and Text Proposal for Randomization of PRS Frequency Shift," 3GPP TSG-RAN WG1 Meeting #82, R1-153888, Beijing, P.R. China, Aug. 24-28, 2015, 10 pgs., 3rd Generation Partnership Project.

\* cited by examiner

POSITIONING SIGNAL TECHNIQUES FOR NARROWBAND DEVICES

CROSS REFERENCES

The present application for patent claims priority to U.S. Provisional Patent Application No. 62/296,037 by Wang et al., entitled "Positioning Signal Techniques For Narrowband Devices," filed Feb. 16, 2016, assigned to the assignee hereof.

BACKGROUND

The following relates to wireless communication, and more specifically to positioning signals for narrowband devices.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

In some cases, a UE may be a low-cost or low-complexity machine type communication (MTC) device that may communicate with a base station in a narrow subband, or narrowband regions, of a system bandwidth of a wireless communications system. Such UEs may be referred to as narrowband devices. Because of the reduced bandwidth available for communications between a base station and narrowband device, some periodic signals provided by the base station may have reduced opportunities for transmission, which may impact some UE operations. For example, a base station may transmit a positioning reference signal (PRS) at a predetermined time period interval, which may be used to determine an accurate position of the UE. In cases where a UE is capable of communications using the full system bandwidth, PRS transmissions may be provided across a PRS bandwidth that may cover the system bandwidth, or cover some portion of the system bandwidth. A narrowband device may, however, be capable of communications using less than the full PRS bandwidth, which may result in fewer PRS transmissions being received at the narrowband device and thus fewer PRS measurements that may be used for position determination.

Reduced PRS measurements at narrowband devices may thus delay position determination for a UE, provide less accurate position for the UE, or both. Accordingly, enhanced efficiency in making PRS measurements in narrowband devices may be desirable in order to provide a relatively accurate position for the UE in a relatively time-efficient manner.

SUMMARY

The described techniques relate to improved methods, systems, devices, or apparatuses that support positioning signals for narrowband devices. A UE and a base station may establish a communication link over a carrier that may use one or more narrowband regions of a system bandwidth of the base station. The base station may configure positioning reference signal (PRS) resources based at least in part on wideband or narrowband transmissions, and a UE may receive the PRS transmissions over one or more narrowband regions. The UE, in some examples, may determine a resource block (RB) index of a received PRS transmission based at least in part on the wideband region of the base station, which may be different than an RB index of a narrowband RB that includes the PRS transmission. In some examples, a base station may configure PRS resources separately for narrowband devices, such as according to a bandwidth of the narrowband devices or with a single PRS tone per symbol compared to two PRS tones per symbol that may be used for wideband PRS transmissions.

In order to further enhance positioning, additional downlink signals may be used to assist in positioning, such as a synchronization signal or control channel signal, for example. A UE may use non-coherent combining of the additional downlink signals and PRS to determine a power delay profile (PDP), or may use weighted combining of the timing results from PRS measurements based and other downlink channel parameters. In further examples, a base station may receive one or more uplink signals from a narrowband UE and may perform positioning measurements and determine UE position based at least in part on the received uplink signals from the UE.

A method of wireless communication is described. The method may include identifying, at a narrowband communications device, PRS resources and receiving, on the PRS resources within a narrowband transmission bandwidth, one or more PRS transmissions in at least one downlink (DL) subframe among a plurality of DL subframes.

An apparatus for wireless communication is described. The apparatus may include means for identifying, at a narrowband communications device, PRS resources and means for receiving, on the PRS resources within a narrowband transmission bandwidth, one or more PRS transmissions in at least one DL subframe among a plurality of DL subframes.

A further apparatus is described. The apparatus may include a processor, memory in electronic communication with the processor, and instructions stored in the memory. The instructions may be operable to cause the processor to identify, at a narrowband communications device, PRS resources and receive, on the PRS resources within a narrowband transmission bandwidth, one or more PRS transmissions in at least one DL subframe among a plurality of DL subframes.

A non-transitory computer-readable medium for wireless communication is described. The non-transitory computer-readable medium may include instructions to cause a processor to identify, at a narrowband communications device, PRS resources and receive, on the PRS resources within a narrowband transmission bandwidth, one or more PRS transmissions in at least one DL subframe among a set of DL subframes.

In some examples of the method, apparatus, or non-transitory computer-readable medium described above, a PRS bandwidth of the one or more PRS transmissions is different than the narrowband transmission bandwidth, and where the identifying comprises identifying a RB index within the PRS bandwidth that is different than an RB index of the PRS resources within the narrowband transmission bandwidth. Some examples of the method, apparatus, or non-transitory computer-readable medium described above may further include processes, features, means, or instructions for determining a PRS sequence based at least in part on the RB index within the PRS bandwidth.

In some examples of the method, apparatus, or non-transitory computer-readable medium described above, the PRS bandwidth is greater than the narrowband transmission bandwidth and less than or equal to a wideband system bandwidth of a transmitter that transmits the one or more PRS transmissions.

In some examples of the method, apparatus, or non-transitory computer-readable medium described above, the receiving comprises sampling signals received in the PRS resources at a higher sampling rate than sampling of other signals received in the set of DL subframes.

In some examples of the method, apparatus, or non-transitory computer-readable medium described above, the receiving comprises receiving a set of RBs in a set of narrowband transmission bandwidths in the at least one DL subframe. Some examples of the method, apparatus, or non-transitory computer-readable medium described above may further include processes, features, means, or instructions for serially processing the set of RBs to determine one or more positioning parameters associated with the one or more PRS transmissions.

In some examples of the method, apparatus, or non-transitory computer-readable medium described above, the one or more positioning parameters include one or more of a reference signal time difference (RSTD) measurement between PRS transmissions of two or more transmitters, a reference signal strength indicator (RSSI) of one or more of the PRS transmissions, or an observed time difference of arrival (OTDA) between PRS transmissions of two or more transmitters.

In some examples of the method, apparatus, or non-transitory computer-readable medium described above, the identifying further comprises identifying a cyclic prefix (CP) length of the one or more PRS transmissions based at least in part on a type of subframe at least one DL subframe. In some examples of the method, apparatus, or non-transitory computer-readable medium described above, the CP length is identified as an extended CP length when the type of subframe is a Multimedia Broadcast Single Frequency Network (MBSFN) subframe.

In some examples of the method, apparatus, or non-transitory computer-readable medium described above, the PRS resources within the narrowband transmission bandwidth comprise resources within a single RB of the narrowband transmission bandwidth. In some examples of the method, apparatus, or non-transitory computer-readable medium described above, the PRS resources comprise wireless transmission resources in a standalone narrowband transmission bandwidth that is outside of a wideband system bandwidth of one or more transmitters of the PRS transmissions, or wireless transmission resources in a guard band bandwidth that is adjacent to the wideband system bandwidth of one or more transmitters of the PRS transmissions.

In some examples of the method, apparatus, or non-transitory computer-readable medium described above, the single RB of the narrowband transmission bandwidth does not include one or more of a cell-specific reference signal (CRS) or PRS transmissions from multiple transmitters.

In some examples of the method, apparatus, or non-transitory computer-readable medium described above, the receiving one or more PRS transmissions comprises receiving a first RB having a PRS transmission from a first base station and a second RB having a PRS transmission from a second base station, the first base station and the second base station transmitting the associated PRS in different RBs to reduce interference between the first base station and the second base station.

In some examples of the method, apparatus, or non-transitory computer-readable medium described above, a periodicity of PRS transmissions within the narrowband transmission bandwidth is reduced relative to a wideband PRS transmission periodicity. In some examples of the method, apparatus, or non-transitory computer-readable medium described above, the number of consecutive downlink subframes with PRS transmissions is increased relative to a wideband PRS transmission. In some examples of the method, apparatus, or non-transitory computer-readable medium described above, one or more transmitters other than a transmitter transmitting the single RB mute transmissions during the transmission of the single RB. In some examples of the method, apparatus, or non-transitory computer-readable medium described above, the PRS resources within the single RB comprise PRS resources within one or more of a first through third symbol of the single RB.

In some examples of the method, apparatus, or non-transitory computer-readable medium described above, the identifying comprises identifying a first PRS bandwidth in a first DL subframe of the set of DL subframes as being within a wideband system bandwidth of one or more transmitters that transmit the PRS transmissions. Some examples of the method, apparatus, or non-transitory computer-readable medium described above may further include processes, features, means, or instructions for identifying a second PRS bandwidth in a second DL subframe of the set of DL subframes as being within a subset of the wideband system bandwidth.

In some examples of the method, apparatus, or non-transitory computer-readable medium described above, the identifying comprises identifying a first PRS bandwidth in a first DL subframe of the set of DL subframes as being within a first subset of a wideband system bandwidth of one or more transmitters that transmit the PRS transmissions. Some examples of the method, apparatus, or non-transitory computer-readable medium described above may further include processes, features, means, or instructions for identifying a second PRS bandwidth in the first DL subframe of the set of DL subframes as being within a second subset of the wideband system bandwidth.

Some examples of the method, apparatus, or non-transitory computer-readable medium described above may further include processes, features, means, or instructions for identifying, at the narrowband communications device, wireless transmission resources within the narrowband transmission bandwidth for one or more downlink channels. Some examples of the method, apparatus, or non-transitory computer-readable medium described above may further include processes, features, means, or instructions for receiving, on the one or more downlink channels, one or more control signals from one or more transmitters. Some examples of the method, apparatus, or non-transitory computer-readable medium described above may further include processes, features, means, or instructions for processing the one or more downlink signals to determine one or more positioning parameters in addition to one or more PRS-based positioning parameters.

In some examples of the method, apparatus, or non-transitory computer-readable medium described above, the one or more downlink signals comprises one or more of a primary synchronization signal (PSS), a secondary synchronization signal (SSS), a physical broadcast channel (PBCH) signal, or a system information block (SIB) signal. In some examples of the method, apparatus, or non-transitory computer-readable medium described above, the processing comprises non-coherent combining of the one or more control signals with one or more PRS transmissions to determine a PDP. In some examples of the method, apparatus, or non-transitory computer-readable medium described above, the processing comprises weighted combining of two or more PRS-based positioning parameters based at least in part on measurements associated with the one or more downlink signals.

In some examples of the method, apparatus, or non-transitory computer-readable medium described above, the identifying comprises determining a first measurement associated with the one or more PRS transmissions. In some examples of the method, apparatus, or non-transitory computer-readable medium described above, the identifying comprises determining a second measurement associated with one or more other downlink signals. In some examples of the method, apparatus, or non-transitory computer-readable medium described above, the identifying comprises estimating a position of the narrowband communications device based at least in part on the first measurement and the second measurement.

A method of wireless communication is described. The method may include identifying PRS resources within a narrowband transmission bandwidth, generating a PRS based at least in part on the identified PRS resources and transmitting, on the PRS resources within the narrowband transmission bandwidth, the PRS in at least one DL subframe among a plurality of DL subframes.

An apparatus for wireless communication is described. The apparatus may include means for identifying PRS resources within a wideband or narrowband transmission bandwidth, means for generating a PRS based at least in part on the identified PRS resources and means for transmitting, on the PRS resources within the narrowband transmission bandwidth, the PRS in at least one DL subframe among a plurality of DL subframes.

A further apparatus is described. The apparatus may include a processor, memory in electronic communication with the processor, and instructions stored in the memory. The instructions may be operable to cause the processor to identify PRS resources within a wideband or narrowband transmission bandwidth, generate a PRS based at least in part on the identified PRS resources and transmit, on the PRS resources within the narrowband transmission bandwidth, the PRS in at least one DL subframe among a plurality of DL subframes.

A non-transitory computer-readable medium for wireless communication is described. The non-transitory computer-readable medium may include instructions to cause a processor to identify PRS resources within a wideband or narrowband transmission bandwidth, generate a PRS based at least in part on the identified PRS resources and transmit, on the PRS resources within the narrowband transmission bandwidth, the PRS in at least one DL subframe among a set of DL subframes.

In some examples of the method, apparatus, or non-transitory computer-readable medium described above, the narrowband transmission bandwidth is a subset of a wideband transmission bandwidth. In some examples of the method, apparatus, or non-transitory computer-readable medium described above, the PRS resources within the narrowband transmission bandwidth comprise resources within a single RB of the narrowband transmission bandwidth.

In some examples of the method, apparatus, or non-transitory computer-readable medium described above, the PRS resources comprise wireless transmission resources in a standalone narrowband transmission bandwidth that is outside of a wideband system bandwidth, or wireless transmission resources in a guard band bandwidth that is adjacent to the wideband system bandwidth. In some examples of the method, apparatus, or non-transitory computer-readable medium described above, the single RB of the narrowband transmission bandwidth does not include a CRS.

Some examples of the method, apparatus, or non-transitory computer-readable medium described above may further include processes, features, means, or instructions for coordinating with one or more base stations to mute transmissions of the one or more other base stations during the transmission of the single RB. In some examples of the method, apparatus, or non-transitory computer-readable medium described above, a number of consecutive downlink subframes with PRS transmissions is increased relative to a wideband PRS transmission. In some examples of the method, apparatus, or non-transitory computer-readable medium described above, the PRS resources within the single RB comprise PRS resources within one or more of a first through third symbol of the single RB. In some examples of the method, apparatus, or non-transitory computer-readable medium described above, a periodicity of PRS transmissions within the narrowband transmission bandwidth is reduced relative to a wideband PRS transmission periodicity.

Some examples of the method, apparatus, or non-transitory computer-readable medium described above may further include processes, features, means, or instructions for receiving a first measurement associated with the PRS from a UE. Some examples of the method, apparatus, or non-transitory computer-readable medium described above may further include processes, features, means, or instructions for receiving a second measurement associated with one or more other downlink channel signals received at the UE. Some examples of the method, apparatus, or non-transitory computer-readable medium described above may further include processes, features, means, or instructions for estimating a position of the UE based at least in part on the first measurement and the second measurement.

In some examples of the method, apparatus, or non-transitory computer-readable medium described above, the one or more other downlink channel signals comprises one or more of a PSS, a SSS, a PBCH signal, or a SIB signal. In some examples of the method, apparatus, or non-transitory computer-readable medium described above, the second measurement comprises a PDP based at least in part on a non-coherent combining of the one or more other downlink channel signals with the PRS transmission.

A method of wireless communication is described. The method may include identifying a plurality of symbols of a DL subframe for PRS reception, identifying a single tone configured as a PRS tone within two or more symbols of the plurality of symbols based at least in part on a symbol location of each symbol and a tone hopping value and receiving, on the identified PRS tones, one or more PRS transmissions.

An apparatus for wireless communication is described. The apparatus may include means for identifying a plurality of symbols of a DL subframe for PRS reception, means for identifying a single tone configured as a PRS tone within two or more symbols of the plurality of symbols based at least in part on a symbol location of each symbol and a tone hopping value and means for receiving, on the identified PRS tones, one or more PRS transmissions.

A further apparatus is described. The apparatus may include a processor, memory in electronic communication with the processor, and instructions stored in the memory. The instructions may be operable to cause the processor to identify a plurality of symbols of a DL subframe for PRS reception, identify a single tone configured as a PRS tone within two or more symbols of the plurality of symbols based at least in part on a symbol location of each symbol and a tone hopping value and receive, on the identified PRS tones, one or more PRS transmissions.

A non-transitory computer-readable medium for wireless communication is described. The non-transitory computer-readable medium may include instructions to cause a processor to identify a set of symbols of a DL subframe for PRS reception, identify a single tone configured as a PRS tone within two or more symbols of the set of symbols based at least in part on a symbol location of each symbol and a tone hopping value and receive, on the identified PRS tones, one or more PRS transmissions.

In some examples of the method, apparatus, or non-transitory computer-readable medium described above, the identifying the single tone within the two or more symbols comprises identifying a first tone hopping value for a first symbol. Some examples of the method, apparatus, or non-transitory computer-readable medium described above may further include processes, features, means, or instructions for identifying a second PRS tone location for a second symbol based at least in part on the first tone hopping value and a first PRS tone location of the first symbol. Some examples of the method, apparatus, or non-transitory computer-readable medium described above may further include processes, features, means, or instructions for identifying a second tone hopping value for the second symbol. Some examples of the method, apparatus, or non-transitory computer-readable medium described above may further include processes, features, means, or instructions for identifying a third PRS tone location for a third symbol based at least in part on the second tone hopping value and the second PRS tone location.

In some examples of the method, apparatus, or non-transitory computer-readable medium described above, the tone hopping value identifies different tones within consecutive symbols configured as PRS tones.

A method of wireless communication is described. The method may include configuring a plurality of symbols of a DL subframe for PRS transmission, configuring, within the plurality of symbols, a single tone as a PRS tone within each symbol based at least in part on a symbol location of each symbol and a tone hopping value and transmitting the PRS on the configured tones of the plurality of symbols.

An apparatus for wireless communication is described. The apparatus may include means for configuring a plurality of symbols of a DL subframe for PRS transmission, means for configuring, within the plurality of symbols, a single tone as a PRS tone within each symbol based at least in part on a symbol location of each symbol and a tone hopping value and means for transmitting the PRS on the configured tones of the plurality of symbols.

A further apparatus is described. The apparatus may include a processor, memory in electronic communication with the processor, and instructions stored in the memory. The instructions may be operable to cause the processor to configure a plurality of symbols of a DL subframe for PRS transmission, configure, within the plurality of symbols, a single tone as a PRS tone within each symbol based at least in part on a symbol location of each symbol and a tone hopping value and transmit the PRS on the configured tones of the plurality of symbols.

A non-transitory computer-readable medium for wireless communication is described. The non-transitory computer-readable medium may include instructions to cause a processor to configure a set of symbols of a DL subframe for PRS transmission, configure, within the set of symbols, a single tone as a PRS tone within each symbol based at least in part on a symbol location of each symbol and a tone hopping value and transmit the PRS on the configured tones of the set of symbols.

In some examples of the method, apparatus, or non-transitory computer-readable medium described above, the configuring the single tone within each symbol comprises configuring a first tone hopping value for a first symbol. Some examples of the method, apparatus, or non-transitory computer-readable medium described above may further include processes, features, means, or instructions for configuring a second PRS tone location for a second symbol based at least in part on the first tone hopping value and a first PRS tone location of the first symbol. Some examples of the method, apparatus, or non-transitory computer-readable medium described above may further include processes, features, means, or instructions for configuring a second tone hopping value for the second symbol. Some examples of the method, apparatus, or non-transitory computer-readable medium described above may further include processes, features, means, or instructions for configuring a third PRS tone location for a third symbol based at least in part on the second tone hopping value and the second PRS tone location.

In some examples of the method, apparatus, or non-transitory computer-readable medium described above, the tone hopping value identifies different tones within consecutive symbols configured as PRS tones.

A method of wireless communication is described. The method may include receiving, at a UE, one or more DL transmissions from a first base station, determining a first DL timing for the first base station, transmitting a first uplink (UL) transmission aligned to the first DL timing and including a first CP having a first CP duration, receiving a timing adjustment from the first base station and transmitting a second UL transmission to the first base station, the second UL transmission based at least in part on the timing adjustment and including a second CP having a second CP duration that is less than the first CP duration.

An apparatus for wireless communication is described. The apparatus may include means for receiving, at a UE, one or more DL transmissions from a first base station, means for determining a first DL timing for the first base station, means for transmitting a first UL transmission aligned to the first DL timing and including a first CP having a first CP duration, means for receiving a timing adjustment from the first base station and means for transmitting a second UL transmission to the first base station, the second UL transmission based at least in part on the timing adjustment and including a second CP having a second CP duration that is less than the first CP duration.

A further apparatus is described. The apparatus may include a processor, memory in electronic communication with the processor, and instructions stored in the memory. The instructions may be operable to cause the processor to receive, at a UE, one or more DL transmissions from a first base station, determine a first DL timing for the first base station, transmit a first UL transmission aligned to the first DL timing and including a first CP having a first CP duration, receive a timing adjustment from the first base station and transmit a second UL transmission to the first base station, the second UL transmission based at least in part on the timing adjustment and including a second CP having a second CP duration that is less than the first CP duration.

A non-transitory computer-readable medium for wireless communications is described. The non-transitory computer-readable medium may include instructions to cause a processor to receive, at a UE, one or more DL transmissions from a first base station, determine a first DL timing for the first base station, transmit a first UL transmission aligned to the first DL timing and including a first CP having a first CP duration, receive a timing adjustment from the first base station and transmit a second UL transmission to the first base station, the second UL transmission based at least in part on the timing adjustment and including a second CP having a second CP duration that is less than the first CP duration.

In some examples of the method, apparatus, or non-transitory computer-readable medium described above, the first uplink transmission uses a physical random access channel (PRACH)-like frame structure. In some examples of the method, apparatus, or non-transitory computer-readable medium described above, the first uplink transmission uses a physical uplink shared channel (PUSCH)-like frame structure. In some examples of the method, apparatus, or non-transitory computer-readable medium described above, resources for the first uplink transmission are scheduled by the first base station. In some examples of the method, apparatus, or non-transitory computer-readable medium described above, resources for the first uplink transmission are randomly selected by the user equipment. In some examples of the method, apparatus, or non-transitory computer-readable medium described above, the resources include time and frequency resources. In some examples of the method, apparatus, or non-transitory computer-readable medium described above, the resources used for the first uplink transmission are known at one or more other base stations. In some examples of the method, apparatus, or non-transitory computer-readable medium described above, one or more base stations receive the first uplink transmission from the user equipment. In some examples of the method, apparatus, or non-transitory computer-readable medium described above, a position of the user equipment is estimated based at least in part on a reception of the first uplink transmission from the user equipment.

A method of wireless communication is described. The method may include receiving, at a first base station, a first UL transmission from a UE, the first UL transmission aligned to DL timing of the UE and including a first CP having a first CP duration, transmitting to the UE a timing adjustment for a second UL transmission by the UE, receiving the second UL transmission from the UE, the second UL transmission based at least in part on the timing adjustment and including a second CP having a second CP duration that is less than the first CP duration and determining a round trip delay (RTD) for transmissions with the UE based at least in part on a time of receipt of the second UL transmission.

An apparatus for wireless communication is described. The apparatus may include means for receiving, at a first base station, a first UL transmission from a UE, the first UL transmission aligned to DL timing of the UE and including a first CP having a first CP duration, means for transmitting to the UE a timing adjustment for a second UL transmission by the UE, means for receiving the second UL transmission from the UE, the second UL transmission based at least in part on the timing adjustment and including a second CP having a second CP duration that is less than the first CP duration and means for determining an RTD for transmissions with the UE based at least in part on a time of receipt of the second UL transmission.

A further apparatus is described. The apparatus may include a processor, memory in electronic communication with the processor, and instructions stored in the memory. The instructions may be operable to cause the processor to receive, at a first base station, a first UL transmission from a UE, the first UL transmission aligned to DL timing of the UE and including a first CP having a first CP duration, transmit to the UE a timing adjustment for a second UL transmission by the UE, receive the second UL transmission from the UE, the second UL transmission based at least in part on the timing adjustment and including a second CP having a second CP duration that is less than the first CP duration and determine an RTD for transmissions with the UE based at least in part on a time of receipt of the second UL transmission.

A non-transitory computer-readable medium for wireless communications is described. The non-transitory computer-readable medium may include instructions to cause a processor to receive, at a first base station, a first UL transmission from a UE, the first UL transmission aligned to DL timing of the UE and including a first CP having a first CP duration, transmit to the UE a timing adjustment for a second UL transmission by the UE, receive the second UL transmission from the UE, the second UL transmission based at least in part on the timing adjustment and including a second CP having a second CP duration that is less than the first CP duration and determine an RTD for transmissions with the UE based at least in part on a time of receipt of the second UL transmission.

Some examples of the method, apparatus, or non-transitory computer-readable medium described above may further include processes, features, means, or instructions for receiving, at the first base station, a set of RTDs associated with the UE from two or more other base stations. Some examples of the method, apparatus, or non-transitory computer-readable medium described above may further include processes, features, means, or instructions for determining a position of the UE based at least in part on the set of RTDs and a known position of the two or more other base stations.

Some examples of the method, apparatus, or non-transitory computer-readable medium described above may further include processes, features, means, or instructions for receiving one or more PRS-based measurements from the UE, and wherein the determining the position of the UE is further based at least in part on the PRS-based measurements.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Additionally or alternatively, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
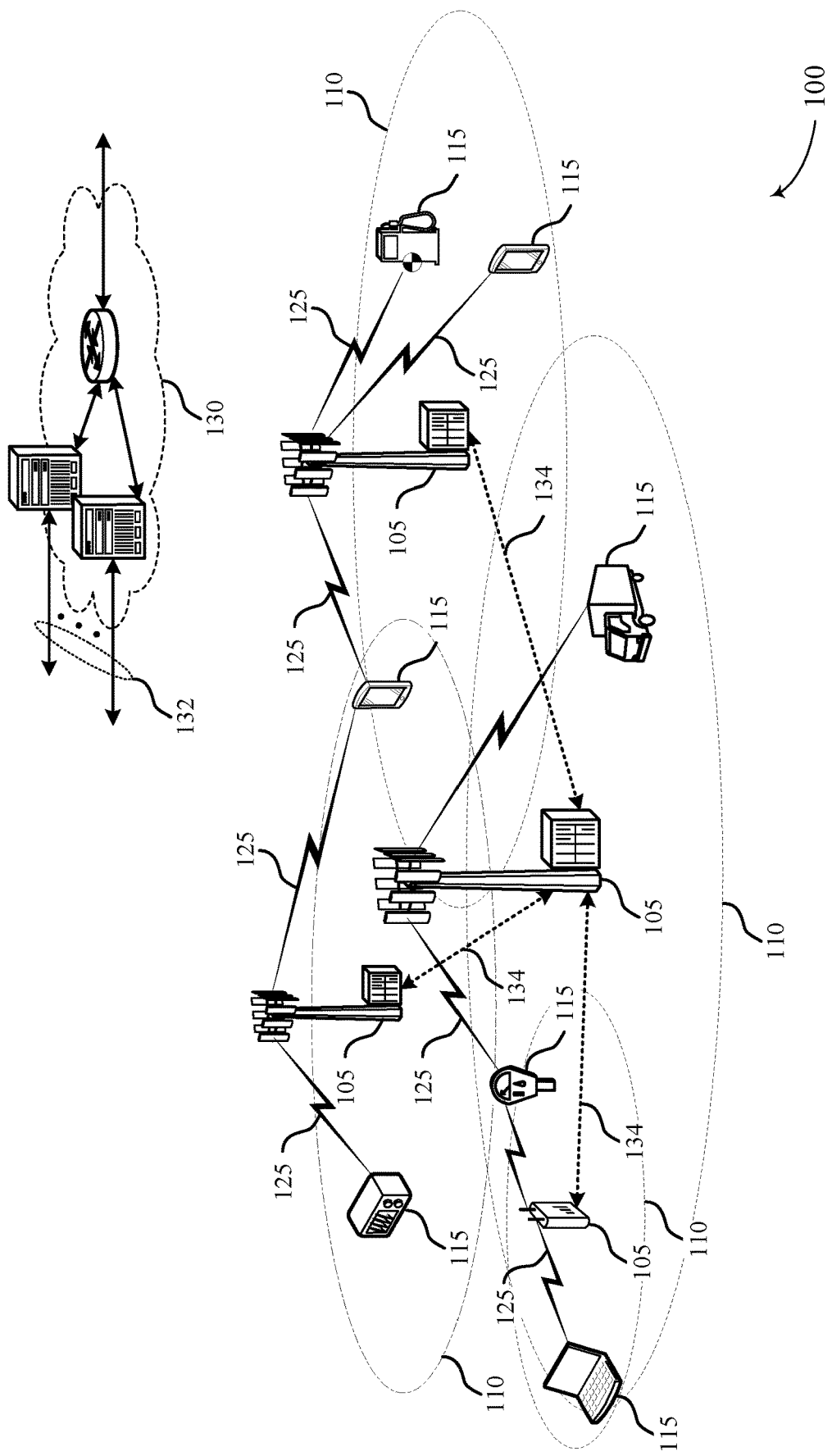
FIG. 1 illustrates an example of a wireless communications system that supports positioning signals for narrowband devices in accordance with aspects of the present disclosure.

Various aspects of the present disclosure provide techniques that may assist in the determination of a user equipment (UE) position for a UE operating using a narrowband portion of a system bandwidth. Such position determination may be made using one or more signals transmitted between the UE and a base station, such as one or more downlink signals that may include positioning reference signals (PRS) or other downlink signals (e.g., synchronization signals, physical broadcast channel (PBCH) signals, system information blocks (SIBs), etc.). A UE may make some measurements based at least in part on the received signals, such as observed time difference of arrival (OTDA) measurements, received signal strength indicator (RSSI) measurements, or reference signal time difference (RSTD) measurements, to name a few examples. The UE measurements may be used, in conjunction with known locations of one or more base stations to determine a position of the UE.

For example, the base station, UE, or other apparatus may identify positioning measurements, such as RSTD, RSSI, OTDA, other measurements, or combinations thereof, associated with an unknown location (e.g., from a UE in an unknown location) and estimate a position of the unknown location based at least in part on the positioning measurements associated with the unknown location, and a set of measurements for known locations stored in the database. In an example, the base station, UE, or other device may determine one or more positioning measurements from the set of measurements (for the known location) that may be similar to the identified positioning measurements associated with the unknown location to estimate the position of the unknown location.

As indicated above, some wireless systems may provide service for a category of low-cost or low-complexity UEs known as MTC devices or narrowband devices. These devices may communicate with some restrictions, which may be based at least in part on physical limitations, and which may include lower data rates, limited transport block size, half duplex operation, or relaxed switching time. Low-cost or low-complexity devices may additionally or alternatively be provided or supported with coverage enhancements, and may be configured to operate within a narrowband region of a wideband carrier. In some cases, the carrier may be divided into multiple narrowband regions serving different devices. The reduced bandwidth of such narrowband devices may present challenges to position determination that may be made based at least in part on PRS transmissions, due to the reduced number of PRS transmission opportunities for narrowband devices. Such reduced numbers of PRS transmission opportunities may result from the reduced bandwidth available for narrowband devices, coverage enhancement techniques for such devices (e.g., relatively long bundling may additionally or alternatively limit time resources available for PRS), and/or relatively large cell radius (e.g., 35 km cell radius) that may result in relatively long round trip delay (RTD) and less accuracy in RTD measurements.

In some examples, a UE may use wideband PRS transmissions that are received in a narrowband portion of a system bandwidth for PRS measurements. In some examples, a UE may determine a resource block (RB) index of a received PRS transmission based at least in part on the wideband region of the base station, which may be different than an RB index of a narrowband RB that includes the PRS transmission. In some examples, a base station may configure PRS resources separately for narrowband devices, such as according to a bandwidth of the narrowband devices or with a single PRS tone per symbol compared to two PRS tones per symbol that may be used for wideband PRS transmissions. Such separately configured PRS resources may be used alone, or in conjunction with other wideband PRS resources or other downlink signals for positioning measurements.

In some examples, in order to additionally or alternatively enhance positioning, additional downlink signals may be used to assist in positioning, such as a synchronization signal or control channel signal, for example. A UE may use non-coherent combining of the additional downlink signals and PRS to determine a power delay profile (PDP), or may use weighted combining of the timing results from PRS measurements based and other downlink channel parameters. In additional examples, a base station may receive one or more uplink signals from a narrowband UE and may perform positioning measurements and determine UE position based at least in part on the received uplink signals from the UE.

Aspects of the disclosure are initially described below in the context of a wireless communication system. Specific examples are then described for positioning resources and techniques for narrowband devices. These and other aspects of the disclosure are further illustrated by and described with reference to apparatus diagrams, system diagrams, and flowcharts that relate to positioning signals for narrowband devices.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. The base stations 105 and UEs 115 may performing positioning determination for UEs 115 operating in narrowband portions of a system bandwidth according to various techniques as discussed herein.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may additionally or alternatively be referred to as a mobile station, a subscriber station, a remote unit, a wireless device, an access terminal (AT), a handset, a user agent, a client, or like terminology. A UE 115 may additionally or alternatively be a cellular phone, a wireless modem, a handheld device, a personal computer, a tablet, a personal electronic device, an machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may additionally or alternatively be referred to as eNodeBs (eNBs) 105.

Some types of wireless devices may provide for automated communication. Automated wireless devices may include those implementing Machine-to-Machine (M2M) communication or MTC. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, additionally or alternatively referred to as narrowband devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical (PHY) access control, and transaction-based business charging. An MTC device may operate using half-duplex (one-way) communications at a reduced peak rate. MTC devices may additionally or alternatively be configured to enter a power saving "deep sleep" mode when not engaging in active communications. In some examples, some MTC devices may be capable of providing position information of the device, such as MTC devices associated with a mobile or movable piece of equipment. Because of the low cost and low complexity that may be desired for such a device, it may be desirable to determine positioning information based at least in part on, for example, a PRS, or other signals, transmitted by base stations 105 or UEs 115, in order to avoid having a dedicated positioning module (e.g., a global positioning system (GPS) module). Additionally or alternatively, in some cases a dedicated positioning module may not provide timely or accurate positioning information in some scenarios. Thus, techniques described herein may be used to obtain positioning measurements that may be used in position determination.

LTE systems may utilize OFDMA on the DL and single carrier frequency division multiple access (SC-FDMA) on the UL. OFDMA and SC-FDMA partition the system bandwidth into multiple (K) orthogonal subcarriers, which are commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may additionally or alternatively be partitioned into sub-bands. For example, a sub-band may cover 1.08 MHz, and there may be 1, 2, 4, 8 or 16 sub-bands.

A frame structure may be used to organize physical resources. A frame may be a 10 ms interval that may additionally or alternatively be divided into 10 equally sized subframes. Each sub-frame may include two consecutive time slots. Each slot may include 6 or 7 OFDMA symbol periods. A resource element (RE) includes one symbol period and one subcarrier (a 15 KHz frequency range) which may additionally or alternatively be referred to as a tone. A RB may contain 12 consecutive subcarriers in the frequency domain and, for a normal CP in each OFDM symbol, 7 consecutive OFDM symbols in the time domain (1 slot), or 84 REs. Some REs may include DL reference signals (DL-RS). The DL-RS may include a cell-specific reference signals (CRS) and a UE-specific RS (UE-RS). UE-RS may be transmitted on the RBs associated with physical downlink shared channel (PDSCH). The number of bits carried by each RE may depend on the modulation scheme (the configuration of symbols that may be selected during each symbol period). Thus, the more RBs that a UE receives and the higher the modulation scheme, the higher the data rate may be.

Some base stations 105 may utilize a portion of the available DL bandwidth to broadcast multimedia data to some or all UEs 115 within the coverage area 110. For example, a wireless communications system may be configured to broadcast mobile TV content, or to multicast live event coverage to UEs 115 located near a live event such as a concert or sporting event. In some cases, this may enable more efficient utilization of the bandwidth. These base stations may be referred to as multimedia broadcast multicast service (MBMS) or evolved multimedia broadcast multicast service (eMBMS) cells. In some cases, MBMS cells may be grouped together in a MBMS single frequency network (MBSFN) wherein the broadcast media is transmitted on the same frequency resources by each supporting cell. However, some UEs 115 in the coverage area may elect not to receive the MBMS data. In some examples, MBMS data may additionally or alternatively include periodic signals, such as PRS transmissions, that may be used for positioning determination.

Figure 2:
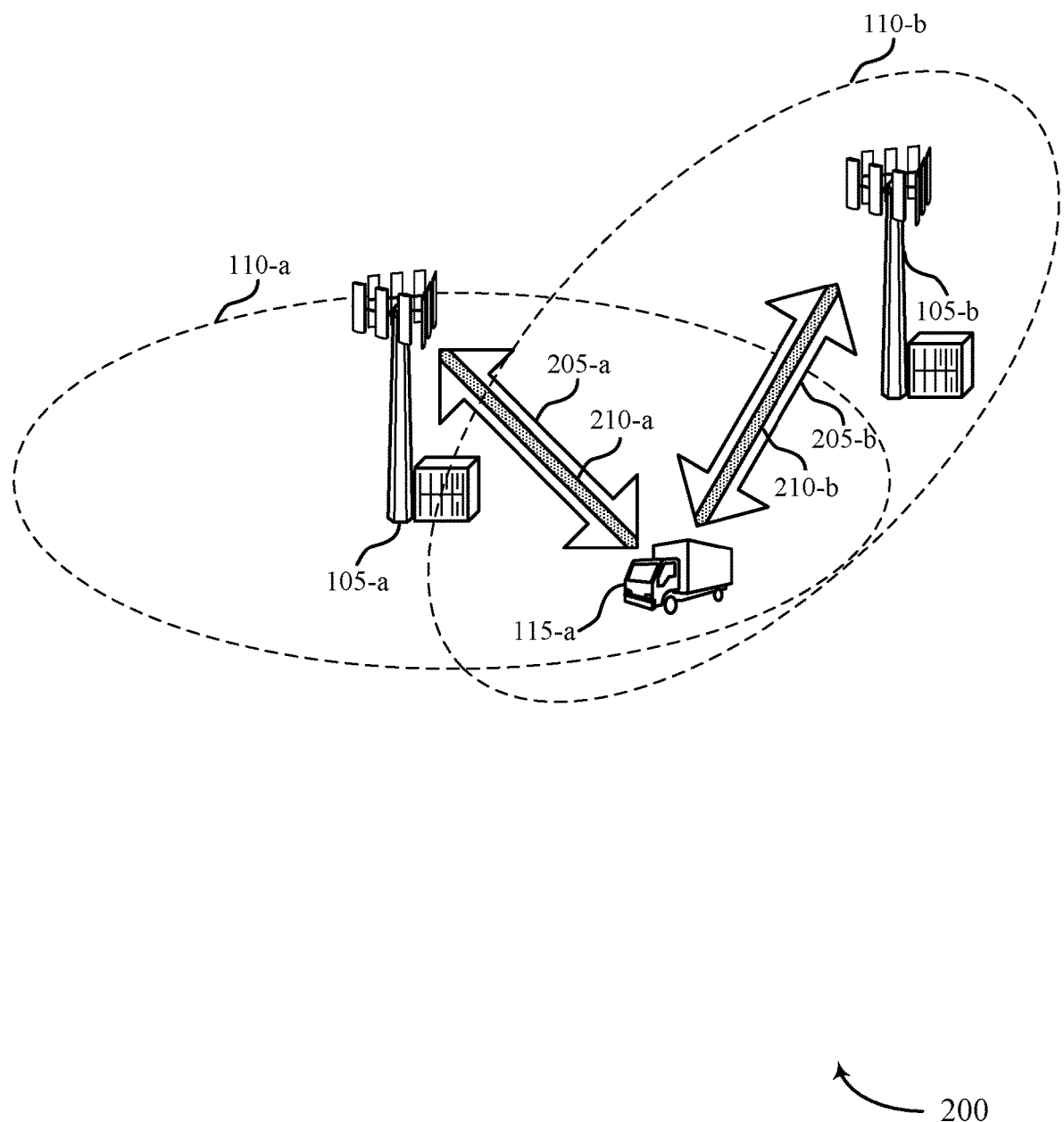
FIG. 2 illustrates an example of a wireless communications system that supports positioning signals for narrowband devices in accordance with aspects of the present disclosure.

FIG. 2 illustrates an example of a wireless communications system 200 for positioning signals for narrowband devices. Wireless communications system 200 may include a first base station 105-a, a second base station 105-b, and UE 115-a, which may be examples of the corresponding devices described with reference to FIG. 1. Base stations 105 may transmit PRS signals, and UE 115-a may receive PRS transmissions, and measurements from such PRS signals may be used to determine position information for the UE 115-a. In some cases, UE 115-a may be a low-cost or low-complexity MTC device.

In some cases, first base station 105-a may transmit a first carrier 205-a that may be divided into multiple narrowband regions serving different devices, and UE 115-a may operate in a narrowband region 210-a (e.g., a 1.4 MHz region) within the frequency range of carrier 205-a (e.g., a 3, 5, 10, 15, or 20 MHz band). Similarly, second base station 105-b may transmit a second carrier 205-b that may be divided into multiple narrowband regions serving different devices, and UE 115-a may operate in a narrowband region 210-b within the frequency range of carrier 205-b. In some examples, the narrowband region 210-b may not be in-band with wideband transmissions, but may be located in a standalone frequency band that is separate from the wideband bandwidth, or may be located in a guard band of the wideband bandwidth. In some examples, UE 115-a may operate according to coverage enhancements that may be provided in different levels (e.g., 5 dB, 10 dB, or 15 dB), which may include bundling of transmissions to provide for coverage enhancement through combining of multiple repeated transmissions.

Some signals transmitted by first base station 105-a and second base station 105-b may be PRS signals that are configured over a wideband PRS bandwidth. Such a wideband PRS bandwidth may cover the entire bandwidth of wideband carriers 205, or may cover a portion of the wideband bandwidth that is still larger than the narrowband regions 210 of carriers 205. As indicated above, due to the reduced bandwidth capabilities of UE 115-a, reduced PRS transmission opportunities may be available to the UE 115-a and may present challenges to positioning for the UE 115-a.

In some examples, UE 115-a may determine wideband PRS resources for one or both of base station 105-a or base station 105-b, and may receive portions of the wideband PRS resources that are transmitted in the respective narrowband regions 210, when the narrowband regions 210 and in-band with the wideband PRS resources. In examples where the narrowband regions 210 are in a standalone frequency band, or in a guard band of wideband carriers 205, the base stations 105 may configure dedicated narrowband PRS resources for the narrowband regions 210. In some examples, such dedicated narrowband PRS resources may have a same configuration design as wideband PRS transmission (e.g., two tones per symbol and using established PRS tone hopping).

In other examples, the dedicated narrowband PRS resources may have a different design than established wideband PRS, such as, for example, having one tone per symbol configured for PRS with two tone hopping values, that may provide for a larger frequency reuse for PRS compared to established wideband PRS transmissions. Such larger frequency reuse may provide enhanced frequency diversity for PRS transmissions which may help to enhance PRS measurements. In some examples, one or more other downlink signals, such as a primary synchronization signal (PSS), secondary synchronization signal (SSS), PBCH signal, SIB, or combinations thereof, may be used in conjunction with PRS transmissions to determine positioning measurements that may be used to determine a position of UE 115-a. In some examples, the one or more other downlink signals may be used alone, without associated PRS measurements, to determine UE 115-a position.

In some examples, UE 115-a may transmit signals to first base station 105-a, second base station 105-b, or both, that may be used for position determination of the UE 115-a, either alone or in conjunction with PRS measurements. In such examples, base stations 105 may use uplink timing for uplink signals from UE 115-a to determine timing estimations. For example, UE 115-a may transmit physical random access channel (PRACH)-like or physical uplink shared channel (PUSCH)-like transmissions that may be received at base stations 105. The uplink signals, in some examples, may have a signal structure similar to PRACH or PUSCH, but that may be transmitted on a different resources and may be scheduled (different than random PRACH transmissions) or may be random (similar to PRACH transmissions). In some examples where the uplink transmission is scheduled, the time and/or frequency resources used for the uplink transmission may be available to one or more base stations. In such examples, the first base station 105-a and second base station 105-b may coordinate to provide associated timing information for signals received from UE 115-a and determine position of the UE 115-a based at least in part on the timing information. For example, UE 115-a may transmit an initial transmission (e.g., a positioning transmission having similar characteristics to a PRACH transmission) that is aligned to downlink timing of received downlink signals from the first base station 105-a. The initial transmission may be transmitted using a relatively long cyclic prefix. Both the first base station 105-a and second base station 105-b may receive the initial transmission, and perform receive processing on the initial transmission (e.g., PRACH-like processing of the reception, providing an initial timing to within +/−2 microseconds that may not be accurate enough for positioning). First base station 105-a and second base station 105-b may each perform a timing adjustment for the UE 115-a and provide timing adjustment information to the UE 115-a. The UE 115-a, based at least in part on the timing adjustment information, may independently adjust timing for each base station 105 and transmit an uplink signal to each base station using a normal cyclic prefix (NCP) or extended cyclic prefix (ECP), either of which have a shorter duration than the cyclic prefix of the initial transmission. Each base station 105 may receive the subsequent associated transmission, which would have relatively low residual timing errors, and determine a relatively accurate timing estimation that may be used for positioning determination of the UE 115-a.

Figures 3A, 3B:
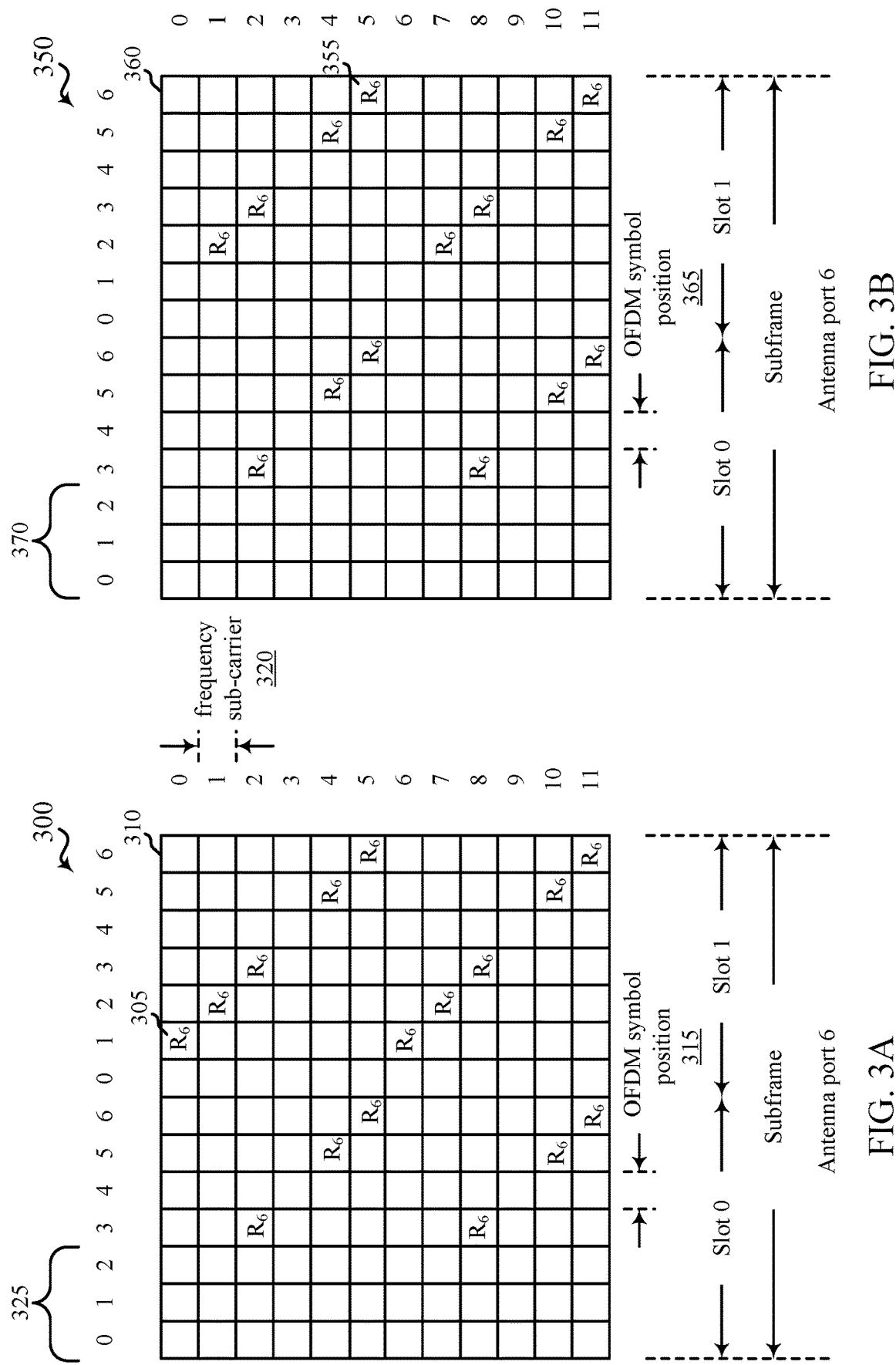
FIGS. 3A and 3B illustrate examples of wireless resources for positioning reference signal (PRS) transmissions for narrowband devices in accordance with aspects of the present disclosure.

FIG. 3A shows a downlink channel resource block 300 in which a PRS 305 may be transmitted in a downlink channel, in accordance with various aspects of the present disclosure. By way of example, the downlink channel resource block 300 may be transmitted by one of the base stations 105 described with reference to FIG. 1 or FIG. 2. By way of an example, the PRS 305 shown in FIG. 3A may be a PRS 305 mapped to antenna port 6 of the LTE/LTE-A New Carrier Type (NCT). The PRS 305 may be transmitted on one or two PBCH antenna ports.

The downlink channel resource block 300 includes a plurality of resource elements 310. Each resource element 310 may correspond to one of a number of symbol periods (e.g., OFDM symbol positions 315) and one of a number of frequency sub-carriers 320. By way of example, the downlink channel resource block 300 includes resource elements spanning fourteen OFDM symbol positions (or two slots, labeled Slot 0 and Slot 1; or one Subframe) and twelve frequency sub-carriers. By way of an example, the PRS 305 may be transmitted in a set of one or more resource elements 310 of the downlink channel resource block 300, such as, in the resource elements labeled $R_6$. In the example of FIG. 3A, PRS 305 may not be transmitted within the first three symbol 325 of the first slot, as the first three symbol 325 may be reserved for control channel transmissions.

The PRS 305 may have a number of configurable parameters. For example, the PRS 305 may have a configuration index, $I_{PRS}$, mapped to the parameters $T_{PRS}$ and $\Delta_{PRS}$, where $T_{PRS}$ is a periodicity (e.g., 160, 320, 640, or 1280 ms) of transmissions of the PRS 305, and where $\Delta_{PRS}$ is a subframe offset (e.g., a subframe offset of 0 to 1120). The PRS 305 may additionally or alternatively have configuration parameters such as a duration, $N_{PRS}$; a number, M, of consecutive transmissions defining a measurement period; muting information (e.g., a muting parameter); a variable cell-specific frequency shift parameter, $V_{shift}$; a PRS bandwidth; and a number, n, of cells to measure. The duration, $N_{PRS}$, may define a number of consecutive downlink subframes included in a PRS transmission (e.g., 1, 3, 4, or 6). The number of consecutive PRS transmissions defining a measurement period may depend on an intra-frequency or inter-frequency configuration of the PRS, and may in some cases be 8, 16, or 32. The muting information may mask PRS transmissions with a periodicity of 3, 4, 8, or 16. The variable cell-specific frequency shift parameter, $V_{shift}$, may in some examples be a value between 1 and 6, enabling a reuse factor of 6. The PRS bandwidth may in some examples be configured as 6, 15, 35, 50, 75, or 100 resource blocks. The number of cells to measure, n, may be any number of cells for which PRS measurements may be made.

A UE such as one of the UEs 115 described with reference to FIG. 1 or 2 may receive a PRS such as the PRS 305 from one or more base stations 105. The UE may additionally or alternatively receive signaling from the base stations that may indicate configuration parameters for an OTDA reference cell and one or more OTDA neighboring cells. In some examples, an OTDA-ReferenceCell Info message may indicate configuration parameters for the OTDA reference cell, and one or more OTDA-NeighborCell Info messages may indicate configuration parameters for one or more OTDA neighboring cells. The OTDA-NeighborCell Info messages may include a slot timing offset and a PRS subframe offset between the reference cell and neighboring cells. The slot timing offset and the PRS subframe offset may be used for inter-frequency PRS transmissions, where base station transmission timing differences may exceed one subframe. An OTDA-NeighborCell Info message additionally or alternatively enables the use of PRS transmissions in inter-frequency and carrier aggregation mode scenarios.

A UE may make multiple PRS measurements and report an RSTD for n−1 neighboring cells within a measurement period, $T_{RSTD}$, from the start of an initial PRS transmission. A UE may make a particular number of suitable PRS measurements (e.g., M/2 suitable measurements) within the measurement period, $T_{RSTD}$, before its PRS measurements are deemed useful.

The PRS transmissions of multiple base stations of a single operator may be synchronized across a same frequency to reduce interference. However, in dense deployments of base stations, a base station may mute its PRS transmission in accordance with a muting pattern.

FIG. 3B shows a downlink channel resource block 350 in which a PRS 355 may be transmitted in a downlink channel, in accordance with various aspects of the present disclosure. By way of example, the PRS 355 shown in FIG. 3B may be a PRS 355 mapped to antenna port 6 of the LTE/LTE-A New Carrier Type (NCT). The PRS 355 may be transmitted on four PBCH antenna ports.

The downlink channel resource block 350 includes a plurality of resource elements 360. Each resource element 360 may correspond to one of a number of symbol periods (e.g., OFDM symbol positions 365) and one of a number of frequency sub-carriers 320. By way of example, the downlink channel resource block 350 includes resource elements spanning fourteen OFDM symbol positions (or two slots, labeled Slot 0 and Slot 1; or one Subframe) and twelve frequency sub-carriers.

By way of an example, the PRS 355 may be transmitted in a set of one or more resource elements 360 of the downlink channel resource block 350, such as, in the resource elements labeled $R_6$. But for the locations of the resource elements 360 defining the PRS 355, the downlink channel resource block 350 and PRS 355 may be configured similarly to the downlink channel resource block 300 and PRS 305. In the example of FIG. 3B, PRS 355 may not be transmitted within the first three symbol 370 of the first slot, as the first three symbol 370 may be reserved for control channel transmissions.

As indicated above, PRS 305 and PRS 355 may, in some examples, be configured over a PRS bandwidth that may span an entire wideband system bandwidth of a base station, or may be configured to span less than the wideband system bandwidth but still more than a narrowband portion of bandwidth that may be used by narrowband communications devices. In some examples, a base station may configure wideband PRS transmissions (e.g., PRS 305, PRS 355), and a narrowband device may be configured in an in-band deployment and may use the wideband PRS transmissions for PRS measurements. In order to determine PRS measurements, the UE may determine an RB index within the PRS bandwidth, in order to determine for PRS sequencing information, and this RB index might be different from an RB index within the total wideband bandwidth and may additionally or alternatively be different from an RB index within the narrowband bandwidth of the narrowband UE. Thus, in some examples, a UE may identify a RB index within the PRS bandwidth that is different than an RB index of the PRS resources within the narrowband transmission bandwidth and determine the PRS sequence of the PRS transmission based at least in part on the RB index within the PRS bandwidth.

In some examples, a narrowband UE may be capable of receiving a single RB in a particular downlink subframe. In some examples, such bandwidth-limited UEs may over-sample the received PRS transmission in order to improve resolution and provide more accurate PRS measurements. In other examples, a narrowband UE may be capable of receiving multiple RBs at its RF front end (e.g., 6 RBs) and may be capable of processing a single RB at a time. In such examples, the UE may receive and store multiple RBs simultaneously and store the associated PRS signals. The UE may then serially process narrowband (1RB) baseband signals (e.g., take 6 milliseconds to process 6 RBs. Such a technique may provide enhanced resolution for PRS measurements without oversampling, thus may have reduced processing requirements at the expense of additional RF front-end and storage capabilities.

In some examples, wideband PRS transmissions, if transmitted in MBSFN subframes, will use ECP, but a narrowband UE may not be capable to support ECP. In such examples, such narrowband UEs may not be able to use PRS subframes that are transmitted in MBSFN subframes, and may skip PRS reception and processing in such subframes. In examples where a narrowband UE may be capable of supporting ECP, a base station may provide additional signaling (e.g., SIB signaling, radio resource control (RRC), or combinations thereof) to enable the UE to identify CP length in wideband PRS subframes.

While the downlink channel resource block 300 and downlink channel resource block 350 may be used for wideband PRS configuration, in some examples a narrowband UE may not be capable of receiving wideband transmissions or may not be configured to receive in-band narrowband transmissions (e.g., a standalone or guard band deployment). In such cases, a dedicated narrowband PRS may be configured by a base station. Such a dedicated narrowband PRS may be configured with one RB bandwidth, and UEs may use oversampling to improve resolution, in some examples. In some examples, a dedicated narrowband PRS may be configured for transmission to avoid any RBs that include CRS transmissions. In other examples, a base station may configure CRS transmissions to avoid any RBs that include PRS transmissions. Additionally or alternatively, in order to reduce interference, muting may be used, or a frequency of muting may be increased. for PRS configured RBs to assist in the detection of base stations having relatively weak signals. In some examples, different base stations may use different RBs for PRS transmission, to accommodate UEs that are not capable of measuring multiple RBs at the same time. In some examples, in order to provide increased positioning measurement accuracy, the periodicity of the dedicated narrowband PRS may be reduced relative to wideband PRS periodicity. In some examples, the number of consecutive DL subframes with PRS transmission is increased relative to a wideband PRS transmission. For example, additional PRS period values (e.g., 20 ms, 40 ms, 80 ms) may be provided to improve accuracy in deep coverage. Additionally or alternatively, one or more resource elements within the first three symbols of the first slot (e.g., symbols 325 of downlink channel resource block 300 or symbols 370 of downlink channel resource block 350) may be configured for PRS transmission in standalone or guard-band deployment.

In some examples, in order to additionally or alternatively enhance positioning measurements, one or more downlink transmissions other than PRS transmissions may be used for positioning measurements. For example, a UE may use PSS or SSS transmissions to aid in positioning measurements. In some examples, PSS of SSS transmissions may be combined with PRS measurements to enhance measurement accurate by providing a weighted combining of timing estimation of PRS measurements from PRS-based estimation and PSS/SSS-based estimation. For example, a PSS/SSS-based measurement may be more reliable than PRS-based measurements from a particular base station, and then the PSS/SSS-based measurement from that particular base station may be weighted more heavily and combined with PRS measurements that particular base station to reach a final timing estimation. In other examples, a UE may reconstruct the PSS/SSS signals and use PSS or SSS transmissions as pilots in the frequency domain, and may use non-coherent combing with PRS subframes to get a PDP and signal timing estimation. In some examples, measurements from PSS or SSS transmissions may be sufficient to perform accurate positioning determination of the UE, and a dedicated PRS may not be necessary. In some examples, the one or more other downlink transmissions that may aid positioning measurements may be PBCH transmissions, SIB transmissions, or combinations thereof. For example, PBCH/SIB transmissions may be used as pilots to improve positioning, through non-coherent combing with PRS subframes to get PDP. In some examples, measurements from PBCH or SIB transmissions may be sufficient to perform accurate positioning determination of the UE, and a dedicated PRS may not be necessary.

Figure 4A:
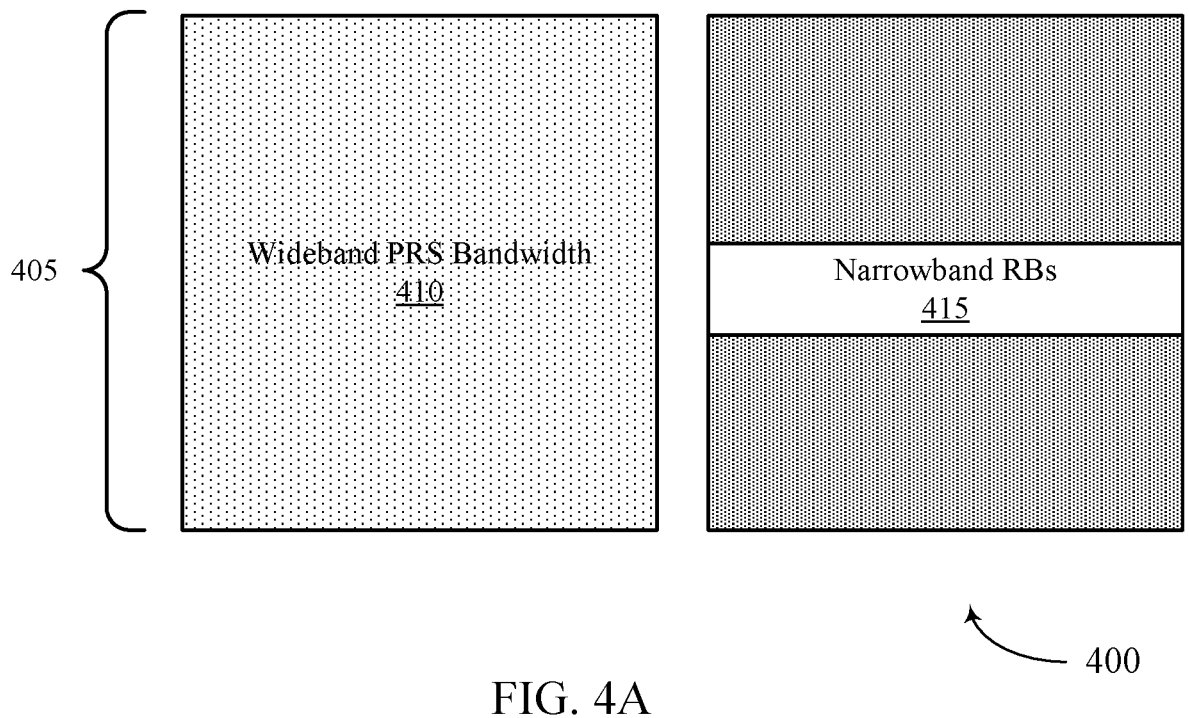
FIGS. 4A and 4B illustrate examples of wireless resources within a system bandwidth that support positioning signals for narrowband devices in accordance with aspects of the present disclosure.

FIG. 4A illustrates an example of a wideband and narrowband resources 400 for positioning signals for narrowband devices. In some cases, wideband and narrowband resources 400 may represent aspects of techniques performed by a UE 115 or base station 105 as described with reference to FIGS. 1-3. In the example of FIG. 4A, a system bandwidth 405 may be available at a base station for wideband transmissions, and the base station may configure a wideband PRS bandwidth 410 to span the entire system bandwidth 405. Narrowband RBs 415, may be configured in a narrowband portion of the system bandwidth 405, and may be used for narrowband communications with one or more narrowband UEs.

In the example, of FIG. 4A, a UE may be capable of receiving both wideband PRS transmissions, as well as narrowband PRS transmissions, and in some subframes may measure wideband PRS, and measure narrowband PRS transmissions in some subframes.

Figure 4B:
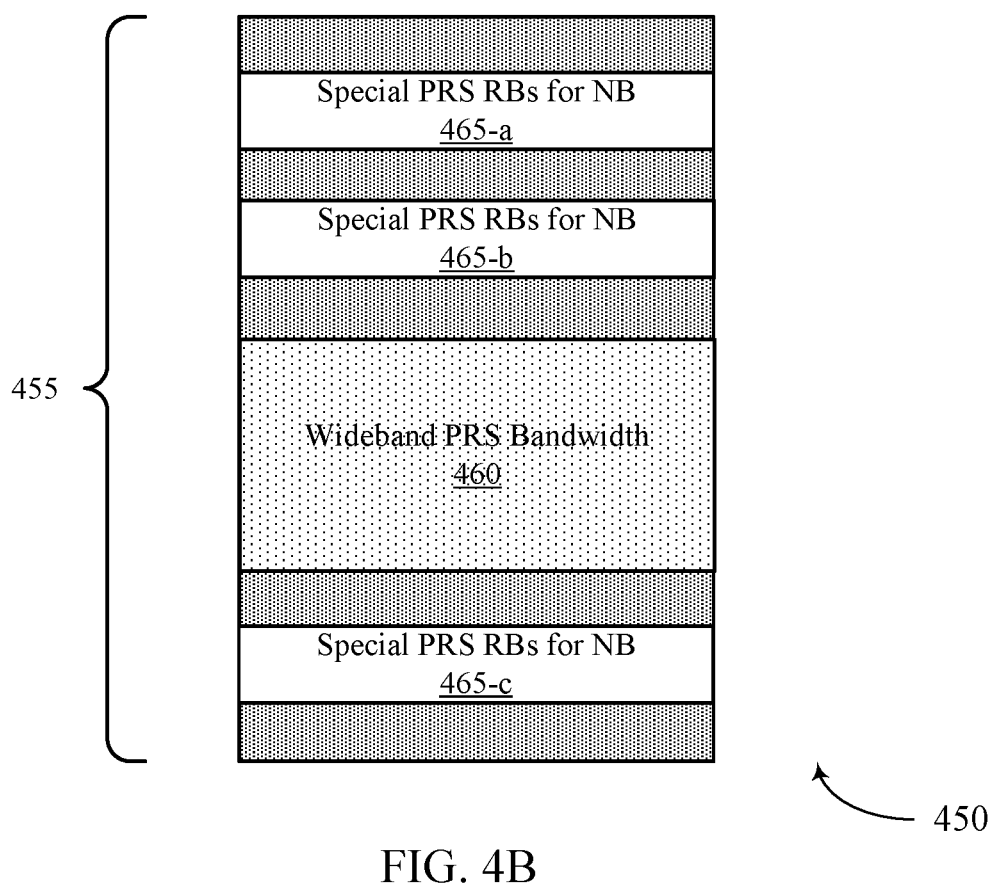

In some cases, a wideband PRS bandwidth may be less than a system bandwidth, and a base station may use one or more portions of the system bandwidth for special narrowband PRS transmissions in order to enhance PRS measurements at a UE. FIG. 4B illustrates an example of a wideband and narrowband resources 450 for positioning signals for narrowband devices. In some cases, wideband and narrowband resources 450 may represent aspects of techniques performed by a UE 115 or base station 105 as described with reference to FIGS. 1-3. In the example of FIG. 4B, a system bandwidth 455 may be available at a base station for wideband transmissions, and the base station may configure a wideband PRS bandwidth 460 to span less than the entire system bandwidth 405. Special PRS RBs for narrowband 465-*a*, 465-*b*, and 465-*c* may be configured in narrowband portions of the system bandwidth 455 that are non-overlapping with wideband PRS bandwidth 460. A base station may configure, in some examples, the special PRS RBs for narrowband 465 to provide additional PRS transmissions to narrowband UEs. In some examples, the special PRS RBs for narrowband 465 are not used for other narrowband channels.

Figure 5:
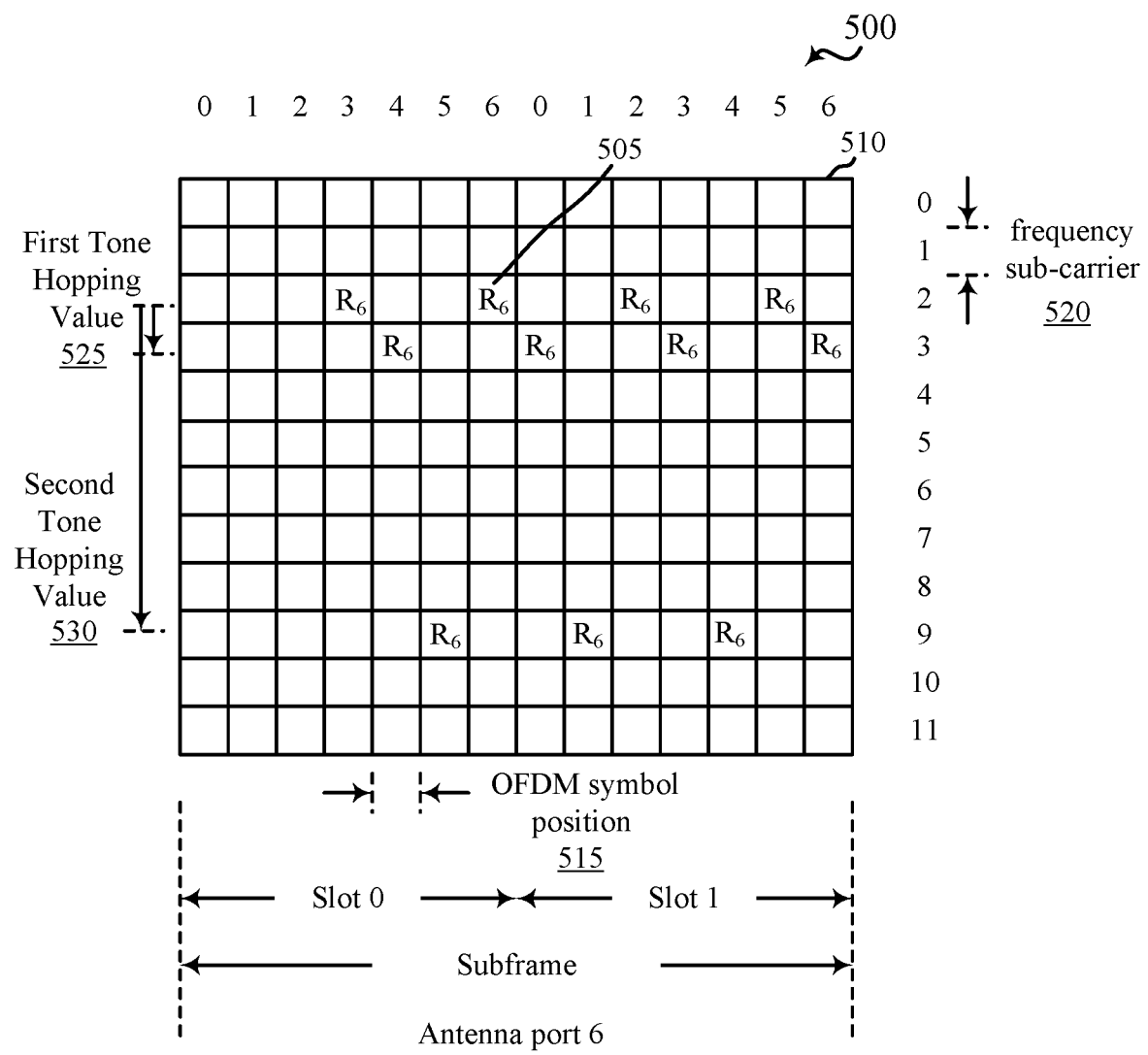
FIG. 5 illustrates an example of PRS resources in a single tone per symbol for narrowband devices in accordance with aspects of the present disclosure.

FIG. 5 illustrates an example of wireless resources 500 for dedicated narrowband PRS transmissions according to some aspects of the present disclosure. In some cases, wireless resources 500 may represent aspects of techniques performed by a UE 115 or base station 105 as described with reference to FIGS. 1-4. Wireless resources 500 may include resources configured for PRS 505 may be transmitted in a downlink channel, in accordance with various aspects of the present disclosure.

The wireless resources 500 includes a plurality of resource elements 510. Each resource element 510 may correspond to one of a number of symbol periods (e.g., OFDM symbol positions 515) and one of a number of frequency sub-carriers 520. By way of example, the wireless resources 500 includes resource elements spanning fourteen OFDM symbol positions (or two slots, labeled Slot 0 and Slot 1; or one Subframe) and twelve frequency sub-carriers.

In the example of FIG. 5, the PRS 505 may be transmitted in a set of one or more resource elements 510 of the wireless resources 500, such as, in the resource elements labeled $R_6$. In this example, a single tone per symbol 515 may be used for PRS 505 (thus providing a design similar to a PRACH design used for uplink PRACH transmissions). The PRS 505 may be configured with multiple hopping values, such as a first tone hopping value 525 that identifies a hopping value to be used in some symbols 515, and a second tone hopping value 530 that may be used in some symbols 515. By providing multiple hopping values, increased frequency reuse (e.g., frequency reuse of 12) may be provided relative to frequency reuse that may be available if two PRS tones per symbol 515 were to be used. In some examples, first tone hopping value 525 provides tone hopping of one tone, and second tone hopping value 530 provides tone hopping of six tones. In some examples, additional tone hopping values may be used, in which case the configured PRS 505 REs may converge to current PRS-like design (e.g., as discussed in FIGS. 3A and 3B) as the number of hopping values increases.

Figure 6:
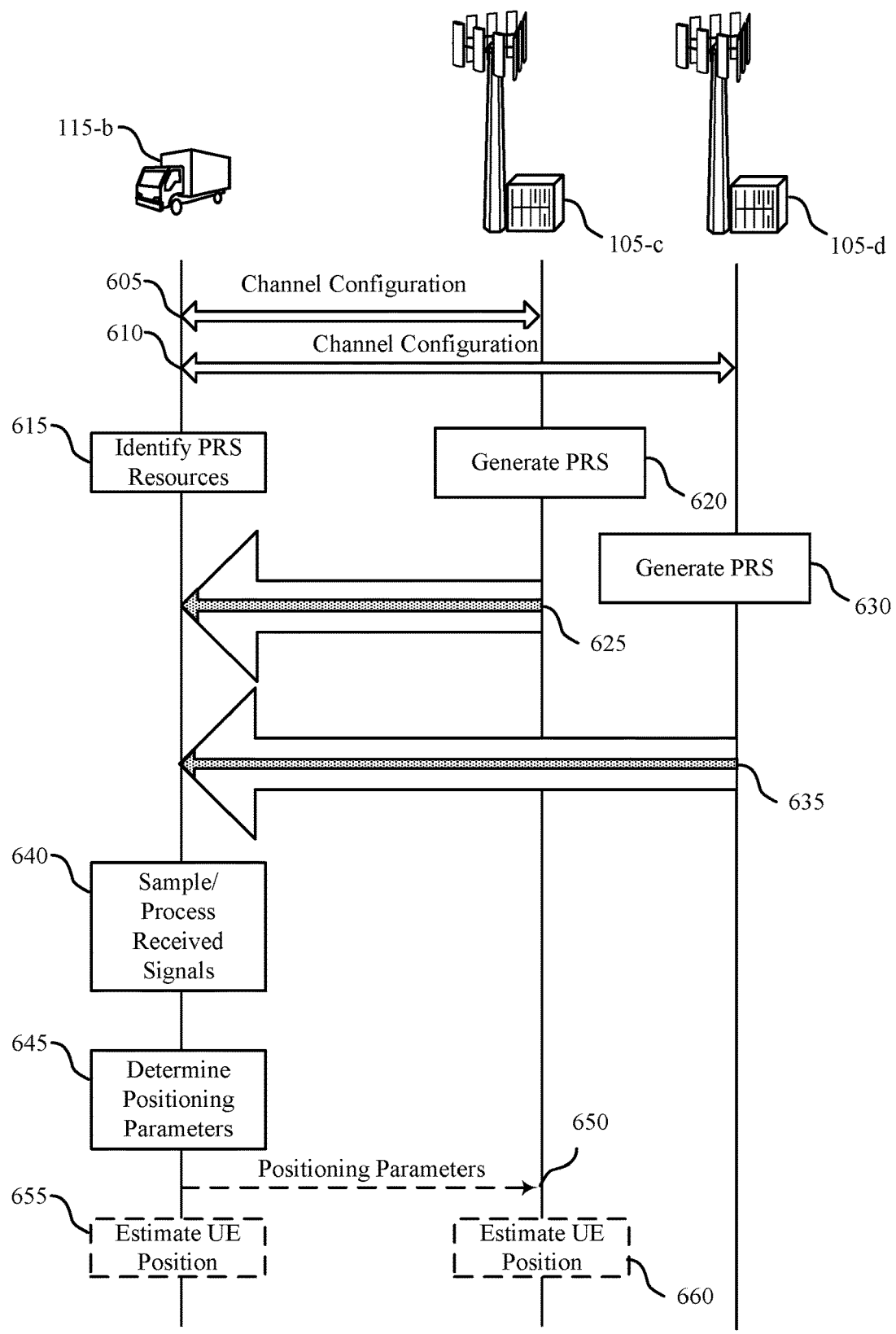
FIG. 6 illustrates an example of a process flow in a system that supports positioning signals for narrowband devices in accordance with aspects of the present disclosure.

FIG. 6 illustrates an example of a process flow 600 for positioning signals for narrowband devices in accordance with various aspects of the present disclosure. Process flow 600 may include first base station 105-c, second base station 105-b, and UE 115-b, which may be examples of the corresponding devices described with reference to FIG. 1-5.

UE 115-b may be a narrowband UE, similarly as discussed above, that may be capable of transmitting and receiving narrowband transmissions within a wideband system bandwidth or in a guard band or standalone deployment. First base station 105-c may communicate channel configuration information 605 with UE 115-b, and second base station 105-d may communicate channel configuration information 610 with UE 115-b. Based at least in part on the channel configuration information, UE 115-b may identify PRS resources, as indicated at block 615. The first base station 105-c may generate a first PRS as indicated at block 620 and transmit the first PRS in transmission 625. The first PRS may be transmitted, in some examples, in-band with a wideband transmission 625 of the first base station 105-c, although guard band or standalone transmissions may be used in some examples. The second base station 105-d may generate a second PRS as indicated at block 630 and transmit the second PRS in transmission 635. The second PRS may be transmitted, in some examples, in-band with a wideband transmission of the first base station 105-c, although guard band or standalone transmissions may be used in some examples. The UE 115-b, at block 640, may sample and process received signals, in a manner similarly as discussed above with respect to FIGS. 1-5. At block 645, the UE may determine positioning parameters, such as timing or signal parameters as discussed above that may be used for position determination. The UE 115-b may optionally transmit the positioning parameters 650 to first base station 105-c (or another entity), which may at block 660 estimate a position of the UE 115-b. In some examples, UE 115-b may estimate its own position based at least in part on the positioning parameters, as indicated at block 655.

Figure 7:
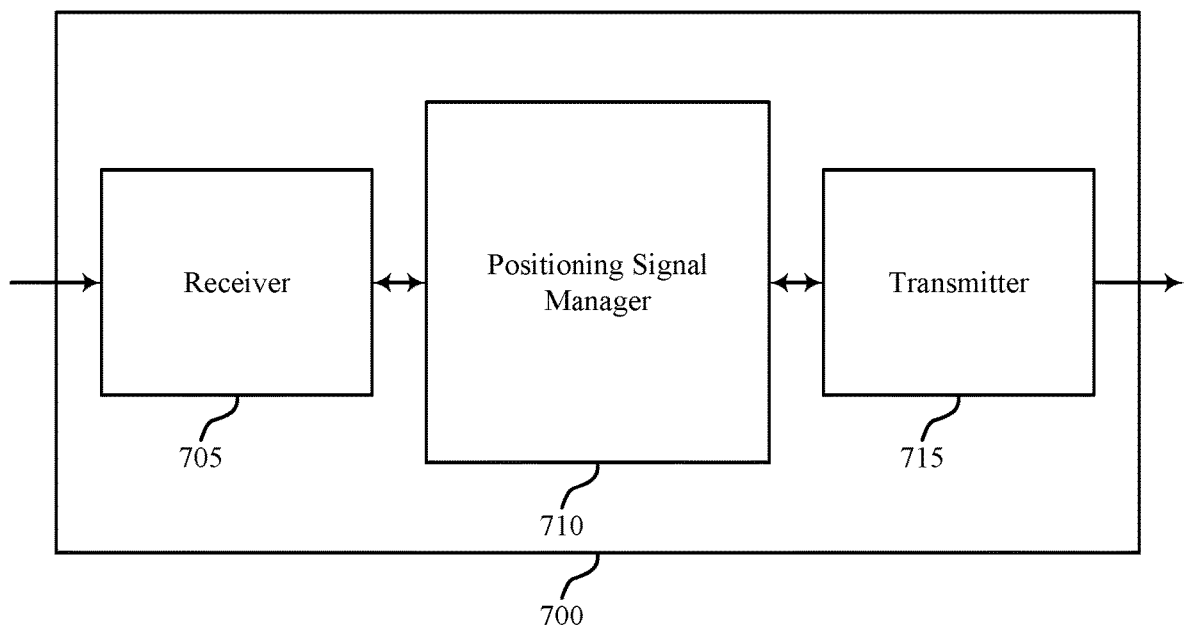
FIGS. 7 through 9 show block diagrams of a wireless device that supports positioning signals for narrowband devices in accordance with aspects of the present disclosure.

FIG. 7 shows a block diagram of a wireless device 700 that supports positioning signals for narrowband devices in accordance with various aspects of the present disclosure. Wireless device 700 may be an example of aspects of a UE 115 described with reference to FIGS. 1-6. Wireless device 700 may include receiver 705, positioning signal manager 710 and transmitter 715. Wireless device 700 may additionally or alternatively include a processor. Each of these components may be in communication with each other.

The receiver 705 may receive information such as packets, user data, or control information associated with various information channels (e.g., control channels, data channels, and information related to positioning signals for narrowband devices, etc.). Information may be passed on to other components of the device. The receiver 705 may be an example of aspects of the transceiver 1025 described with reference to FIG. 10.

The positioning signal manager 710 may identify PRS resources, and receive, on the PRS resources within a narrowband transmission bandwidth, one or more PRS transmissions in at least one DL subframe among a set of DL subframes. The PRS resources may be PRS resources within a wideband PRS transmission, or may be dedicated PRS resources for narrowband devices. The positioning signal manager 710 may, in some examples, identify a plurality of symbols of a DL subframe for PRS reception, identify a single tone configured as a PRS tone within two or more symbols of the plurality of symbols based at least in part on a symbol location of each symbol and a tone hopping value, and receive, on the identified PRS tones, one or more PRS transmissions.

In some examples, the positioning signal manager 710 may manage position determination based at least in part on one or more uplink signals from wireless device 700. In such examples, the positioning signal manager 710 may receive one or more DL transmissions from a first base station, determine a first DL timing for the first base station, transmit a first UL transmission aligned to the first DL timing and including a first CP having a first CP duration, receive a timing adjustment from the first base station, and transmit a second UL transmission to the first base station, the second UL transmission based at least in part on the timing adjustment and including a second CP having a second CP duration that is less than the first CP duration. The positioning signal manager 710 may be an example of aspects of the positioning signal manager 1005 described with reference to FIG. 10.

The transmitter 715 may transmit signals received from other components of wireless device 700. In some examples, the transmitter 715 may be collocated with a receiver in a transceiver module. For example, the transmitter 715 may be an example of aspects of the transceiver 1025 described with reference to FIG. 10. The transmitter 715 may include a single antenna, or it may include a plurality of antennas.

Figure 8:
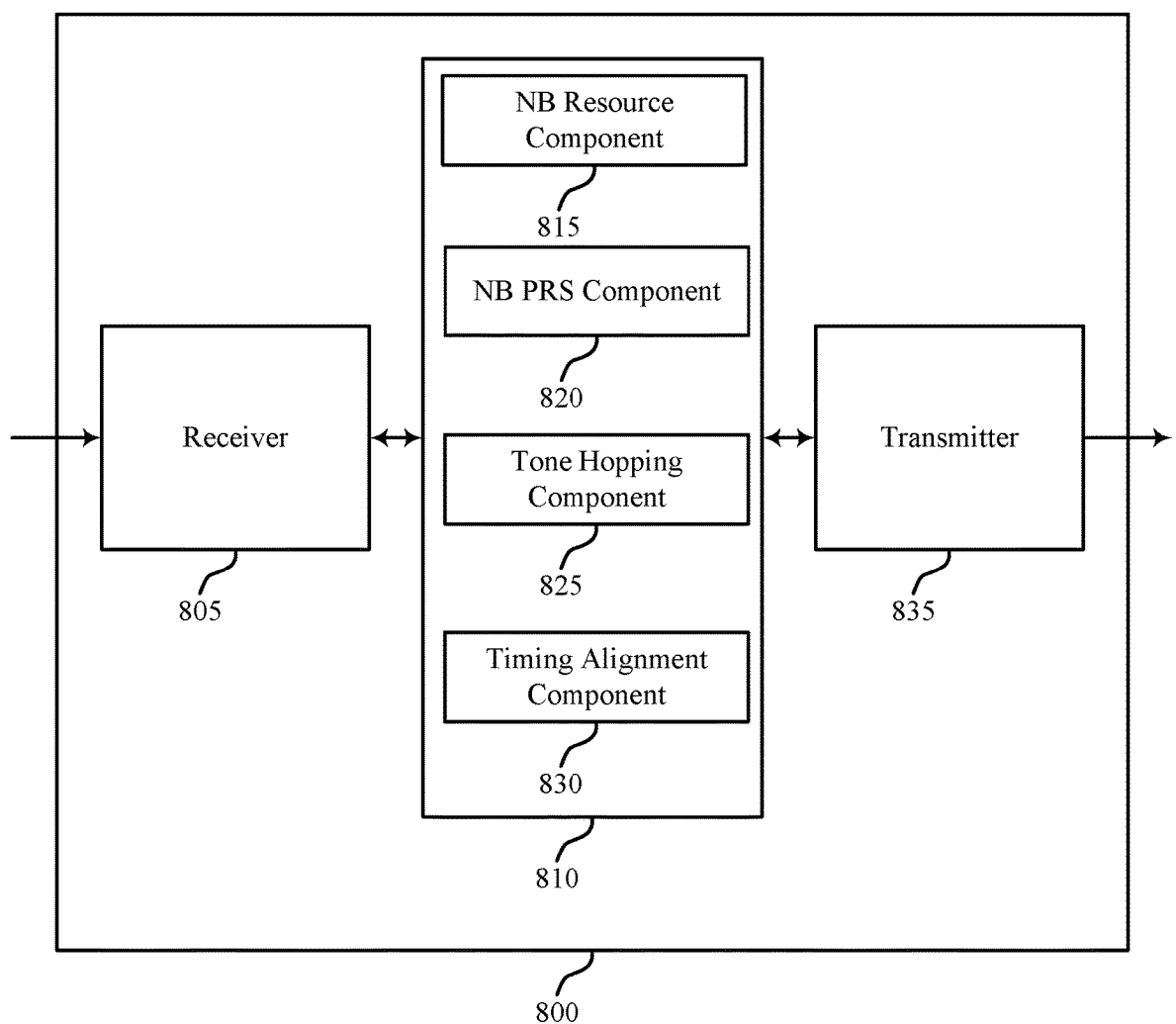

FIG. 8 shows a block diagram of a wireless device 800 that supports positioning signals for narrowband devices in accordance with various aspects of the present disclosure. Wireless device 800 may be an example of aspects of a wireless device 700 or a UE 115 described with reference to FIGS. 1-7. Wireless device 800 may include receiver 805, positioning signal manager 810 and transmitter 835. Wireless device 800 may additionally or alternatively include a processor. Each of these components may be in communication with each other.

The receiver 805 may receive information which may be passed on to other components of the device. The receiver 805 may additionally or alternatively perform the functions described with reference to the receiver 705 of FIG. 7. The receiver 805 may be an example of aspects of the transceiver 1025 described with reference to FIG. 10.

The positioning signal manager 810 may be an example of aspects of positioning signal manager 710 described with reference to FIG. 7. The positioning signal manager 810 may include narrowband (NB) resource component 815, NB PRS component 820, tone hopping component 825 and timing alignment component 830. The positioning signal manager 810 may be an example of aspects of the positioning signal manager 1005 described with reference to FIG. 10.

The NB resource component 815 may identify a PRS bandwidth and PRS resources in one or more DL subframe of a set of DL subframes. In some cases, the PRS bandwidth is greater than the narrowband transmission bandwidth and less than or equal to a wideband system bandwidth of a transmitter that transmits the one or more PRS transmissions. In some cases, the PRS resources within a narrowband transmission bandwidth include resources within a single RB of the narrowband transmission bandwidth. In some cases, the PRS resources include wireless transmission resources in a standalone narrowband transmission bandwidth that is outside of a wideband system bandwidth of one or more transmitters of the PRS transmissions, or wireless transmission resources in a guard band bandwidth that is adjacent to the wideband system bandwidth of one or more transmitters of the PRS transmissions.

In some cases, the single RB of the narrowband transmission bandwidth does not include one or more of a CRS or PRS transmissions from multiple transmitters. In some cases, a periodicity of PRS transmissions within the narrowband transmission bandwidth is reduced relative to a wideband PRS transmission periodicity. In some cases, the number of consecutive DL subframes with PRS transmission is increased relative to a wideband PRS transmission periodicity. In some cases, the PRS resources within the single RB include PRS resources within one or more of a first through third symbol of the single RB.

In some cases, NB resource component 815 may identify a first PRS bandwidth in a first DL subframe of the set of DL subframes as being within a wideband system bandwidth of one or more transmitters that transmit the PRS transmissions. In some cases, a PRS bandwidth of the one or more PRS transmissions is different than the narrowband transmission bandwidth, and the identifying includes identifying a RB index within the PRS bandwidth that is different than an RB index of the PRS resources within the narrowband transmission bandwidth.

The NB PRS component 820 may receive, on the PRS resources within the narrowband transmission bandwidth, one or more PRS transmissions in at least one DL subframe among a set of DL subframes. In some cases, the receiving includes receiving a set of RBs in a set of narrowband transmission bandwidths in the at least one DL subframe.

The tone hopping component 825 may identify a set of symbols of a DL subframe for PRS reception, identify a single tone configured as a PRS tone within each of two or more symbols of the set of symbols based at least in part on a symbol location of each symbol and a tone hopping value, receive, on the identified PRS tones, one or more PRS transmissions, identify a second PRS tone location for a second symbol based at least in part on the first tone hopping value and a first PRS tone location of the first symbol, identify a second tone hopping value for the second symbol, and identify a third PRS tone location for a third symbol based at least in part on the second tone hopping value and the second PRS tone location.

In some cases, the identifying the single tone within each of the two or more symbols includes identifying a first tone hopping value for a first symbol. In some cases, the tone hopping value identifies different tones within consecutive symbols configured as PRS tones.

The timing alignment component 830 may receive one or more DL transmissions from a first base station, determine a first DL timing for the first base station, transmit a first UL transmission aligned to the first DL timing and including a first CP having a first CP duration, receive a timing adjustment from the first base station, and transmit a second UL transmission to the first base station, the second UL transmission based at least in part on the timing adjustment and including a second CP having a second CP duration that is less than the first CP duration.

The transmitter 835 may transmit signals received from other components of wireless device 800. In some examples, the transmitter 835 may be collocated with a receiver in a transceiver module. For example, the transmitter 835 may be an example of aspects of the transceiver 1025 described with reference to FIG. 10. The transmitter 835 may utilize a single antenna, or it may utilize a plurality of antennas.

Figure 9:
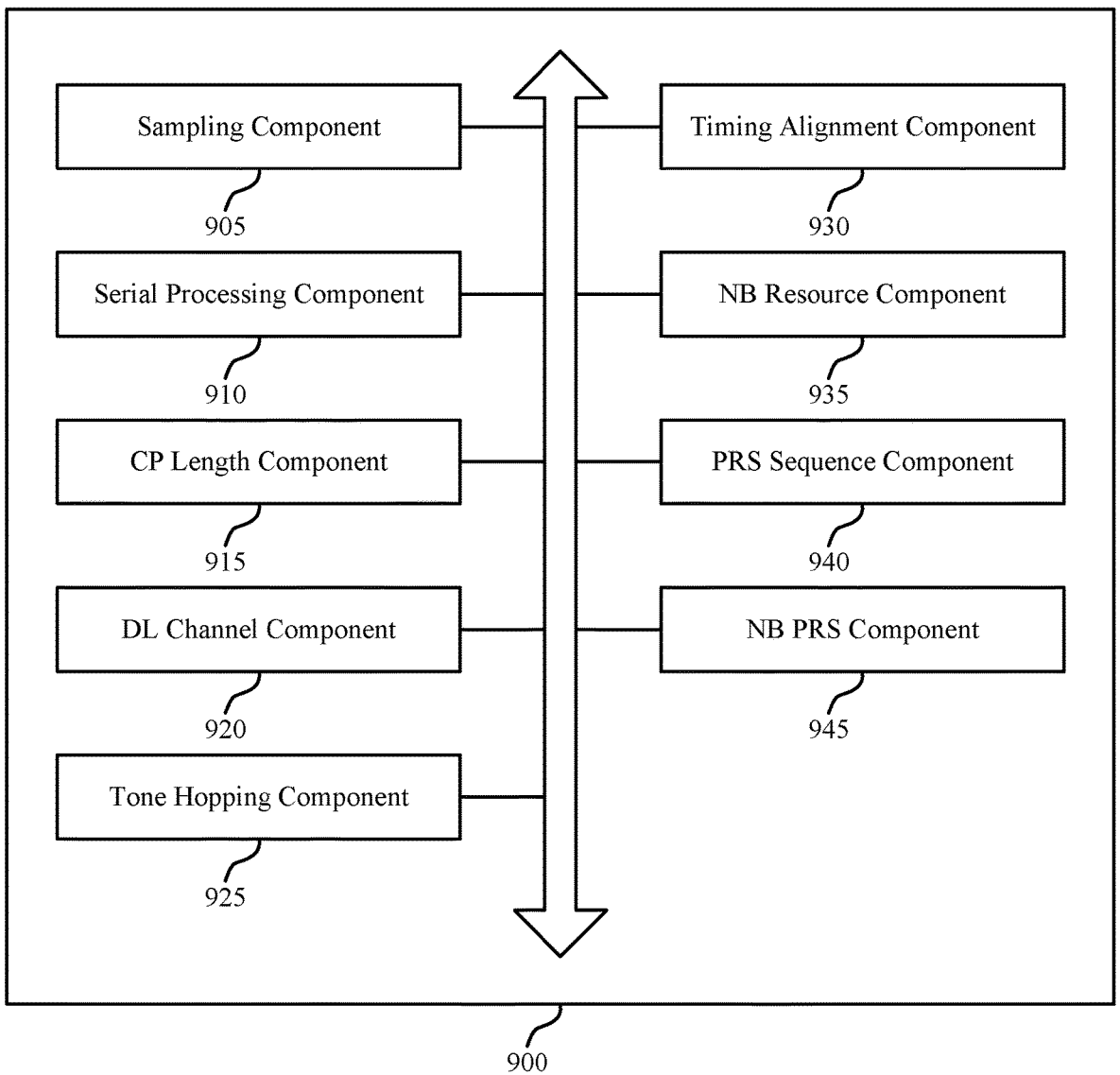

FIG. 9 shows a block diagram of a positioning signal manager 900 which may be an example of the corresponding component of wireless device 700 or wireless device 800. That is, positioning signal manager 900 may be an example of aspects of positioning signal manager 710 or positioning signal manager 810 described with reference to FIGS. 7 and 8. The positioning signal manager 900 may additionally or alternatively be an example of aspects of the positioning signal manager 1005 described with reference to FIG. 10.

The positioning signal manager 900 may include sampling component 905, serial processing component 910, CP length component 915, control channel component 920, tone hopping component 925, timing alignment component 930, NB resource component 935, PRS sequence component 940 and NB PRS component 945. Each of these modules may communicate, directly or indirectly, with one another (e.g., via one or more buses).

The sampling component 905 may sample signals received in the PRS resources at a higher sampling rate than sampling of other signals received in the set of DL subframes. The serial processing component 910 may serially process two or more RBs received at a RF front end to determine one or more positioning parameters associated with the one or more PRS transmissions. In some cases, the one or more positioning parameters include one or more of an RSTD measurement between PRS transmissions of two or more transmitters, an RSSI of one or more of the PRS transmissions, or an OTDA between PRS transmissions of two or more transmitters.

The CP length component 915 may in some cases, identify a CP length of the one or more PRS transmissions based at least in part on a type of subframe of the at least one DL subframe. In some cases, the CP length is identified as an extended CP length when the type of subframe is a Multimedia Broadcast Single Frequency Network (MBSFN) subframe.

The downlink channel component 920 may identify wireless transmission resources within the narrowband transmission bandwidth for one or more downlink channels, receive, on the one or more downlink channels, one or more downlink signals from one or more transmitters, and process the one or more downlink signals to determine one or more positioning parameters in addition to one or more PRS-based positioning parameters. In some cases, the one or more downlink signals includes one or more of a PSS, a SSS, a PBCH signal, or a SIB signal. In some cases, the processing includes non-coherent combining of the one or more downlink signals with one or more PRS transmissions to determine a PDP. In some cases, the processing includes weighted combining of two or more PRS-based positioning parameters based at least in part on measurements associated with the one or more downlink signals.

The tone hopping component 925 may identify a set of symbols of a DL subframe for PRS reception, identify a single tone configured as a PRS tone within each of two or more symbols of the set of symbols based at least in part on a symbol location of each symbol and a tone hopping value, receive, on the identified PRS tones, one or more PRS transmissions, identify a second PRS tone location for a second symbol based at least in part on the first tone hopping value and a first PRS tone location of the first symbol, identify a second tone hopping value for the second symbol, and identify a third PRS tone location for a third symbol based at least in part on the second tone hopping value and the second PRS tone location.

The timing alignment component 930 may receive one or more DL transmissions from a first base station, determine a first DL timing for the first base station, transmit a first UL transmission aligned to the first DL timing and including a first CP having a first CP duration, receive a timing adjustment from the first base station, and transmit a second UL transmission to the first base station, the second UL transmission based at least in part on the timing adjustment and including a second CP having a second CP duration that is less than the first CP duration.

The NB resource component 935 may identify PRS bandwidths and PRS resources in DL subframes, and identify PRS resources within a wideband or narrowband transmission bandwidth. The PRS sequence component 940 may determine a PRS sequence based at least in part on the RB index within the PRS bandwidth.

The NB PRS component 945 may receive, on the PRS resources within the narrowband transmission bandwidth, one or more PRS transmissions in at least one DL subframe among a set of DL subframes. In some cases, the receiving includes receiving a set of RBs in a set of narrowband transmission bandwidths in the at least one DL subframe.

Figure 10:
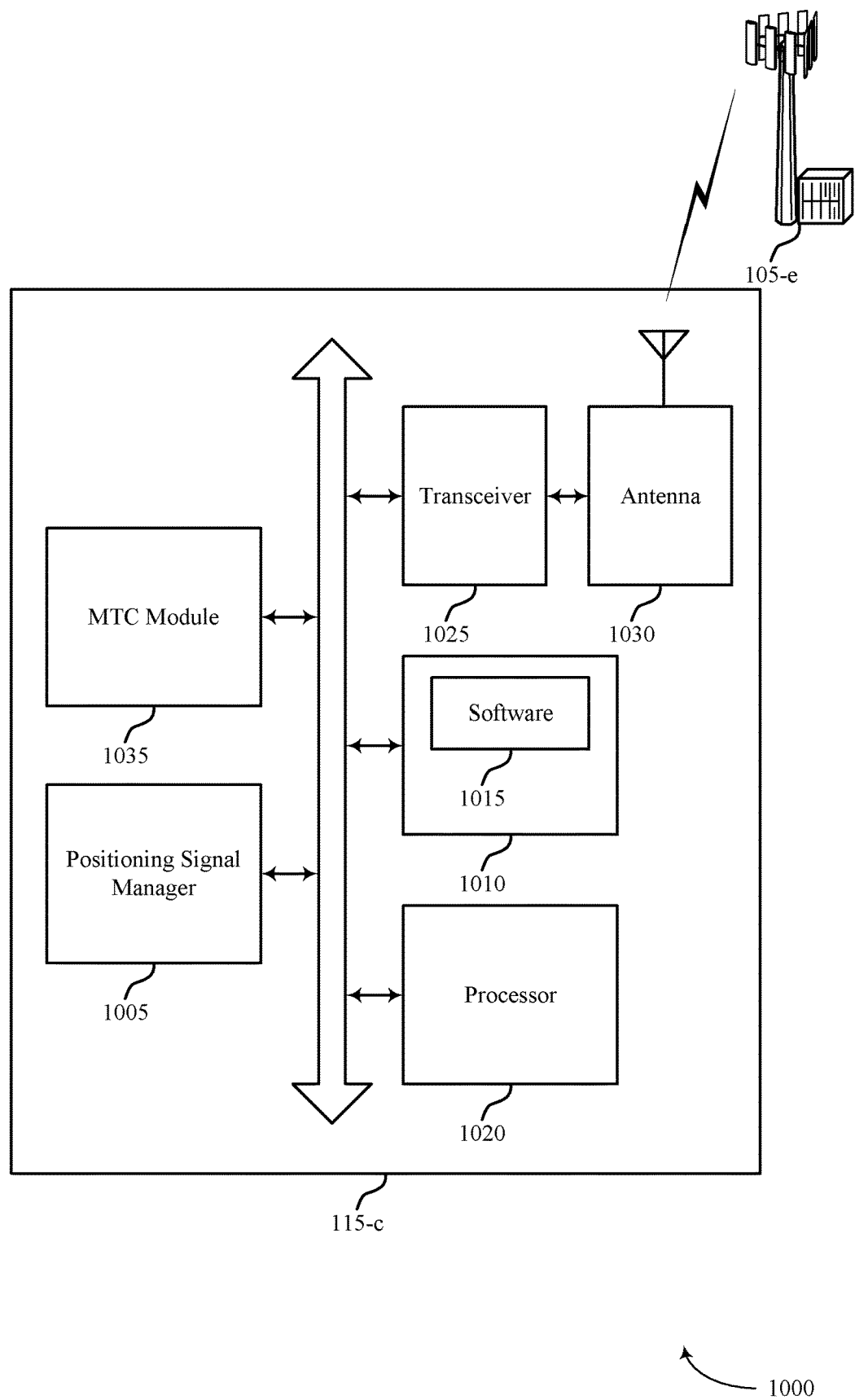
FIG. 10 illustrates a block diagram of a system including a UE that supports positioning signals for narrowband devices in accordance with aspects of the present disclosure.

FIG. 10 shows a diagram of a system 1000 including a device that supports positioning signals for narrowband devices in accordance with various aspects of the present disclosure. For example, system 1000 may include UE 115-c, which may be an example of a wireless device 700, a wireless device 800, or a UE 115 as described with reference to FIGS. 1-9.

UE 115-c may additionally or alternatively include positioning signal manager 1005, memory 1010, processor 1020, transceiver 1025, antenna 1030 and MTC module 1035. Each of these modules may communicate, directly or indirectly, with one another (e.g., via one or more buses). The positioning signal manager 1005 may be an example of a positioning signal manager as described with reference to FIGS. 7 through 9.

The memory 1010 may include random access memory (RAM) and read only memory (ROM). The memory 1010 may store computer-readable, computer-executable software including instructions that, when executed, cause the processor to perform various functions described herein (e.g., positioning signals for narrowband devices, etc.). In some cases, the software 1015 may not be directly executable by the processor but may cause a computer (e.g., when compiled and executed) to perform functions described herein. The processor 1020 may include an intelligent hardware device, (e.g., a central processing unit (CPU), a microcontroller, an application specific integrated circuit (ASIC), etc.)

The transceiver 1025 may communicate bi-directionally, via one or more antennas, wired, or wireless links, with one or more networks, as described above. For example, the transceiver 1025 may communicate bi-directionally with a base station 105 or a UE 115. The transceiver 1025 may additionally or alternatively include a modem to modulate the packets and provide the modulated packets to the antennas for transmission, and to demodulate packets received from the antennas.

In some cases, the wireless device may include a single antenna 1030. However, in some cases the device may have more than one antenna 1030, which may be capable of concurrently transmitting or receiving multiple wireless transmissions.

MTC module 1035 may enable MTC or internet-of-things (IoT) operations as described above with reference to FIG. 1, including narrowband operations.

Figure 11:
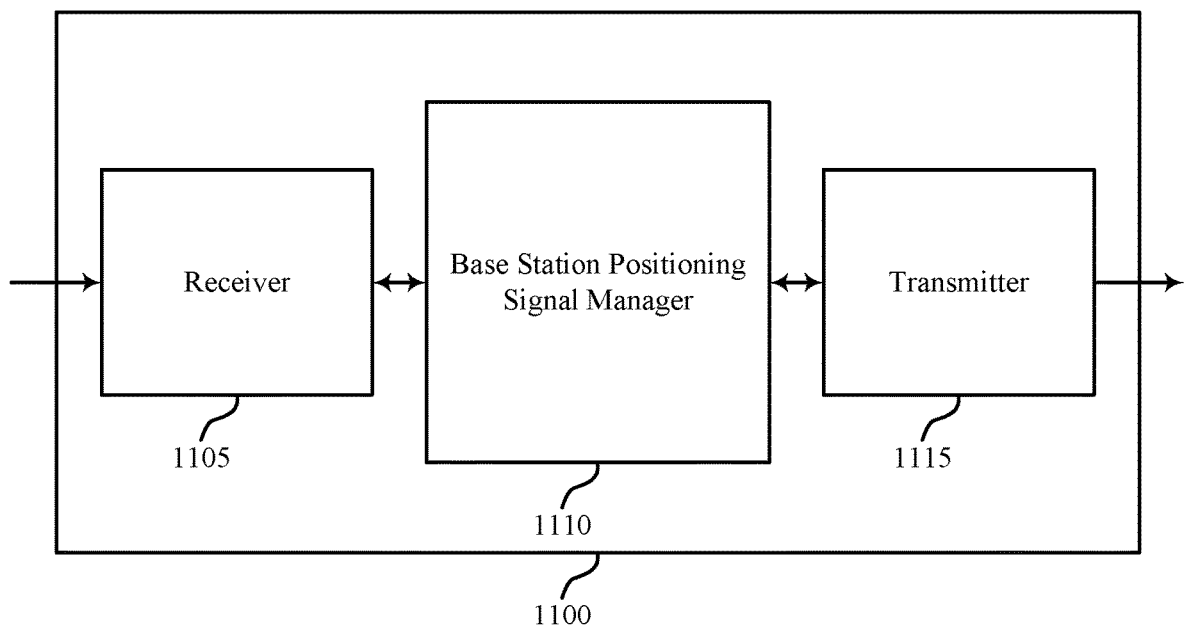
FIGS. 11 through 13 show block diagrams of a wireless device that supports positioning signals for narrowband devices in accordance with aspects of the present disclosure.

FIG. 11 shows a block diagram of a wireless device 1100 that supports positioning signals for narrowband devices in accordance with various aspects of the present disclosure. Wireless device 1100 may be an example of aspects of a base station 105 described with reference to FIGS. 1-6. Wireless device 1100 may include receiver 1105, base station positioning signal manager 1110 and transmitter 1115. Wireless device 1100 may additionally or alternatively include a processor. Each of these components may be in communication with each other.

The receiver 1105 may receive information such as packets, user data, or control information associated with various information channels (e.g., control channels, data channels, and information related to positioning signals for narrowband devices, etc.). Information may be passed on to other components of the device. The receiver 1105 may be an example of aspects of the transceiver 1425 described with reference to FIG. 14.

The base station positioning signal manager 1110 may identify PRS resources within a wideband or narrowband transmission bandwidth, generate a PRS based at least in part on the identified PRS resources, and transmit, on the PRS resources within the wideband or narrowband transmission bandwidth, the PRS in at least one DL subframe among a set of DL subframes.

The base station positioning signal manager 1110 may additionally or alternatively, in some examples, configure a set of symbols of a DL subframe for PRS transmission, configure, within each of the set of symbols, a single tone as a PRS tone within each symbol based at least in part on a symbol location of each symbol and a tone hopping value, and transmit the PRS on the configured tones of the set of symbols.

The base station positioning signal manager 1110 may additionally or alternatively, in some examples, receive a first UL transmission from a UE, the first UL transmission aligned to DL timing of the UE and including a first CP having a first CP duration, transmit to the UE a timing adjustment for a second UL transmission by the UE, receive the second UL transmission from the UE, the second UL transmission based at least in part on the timing adjustment and including a second CP having a second CP duration that is less than the first CP duration, and determine an RTD for transmissions with the UE based at least in part on a time of receipt of the second UL transmission. The base station positioning signal manager 1110 may be an example of aspects of the base station positioning signal manager 1405 described with reference to FIG. 14.

The transmitter 1115 may transmit signals received from other components of wireless device 1100. In some examples, the transmitter 1115 may be collocated with a receiver in a transceiver module. For example, the transmitter 1115 may be an example of aspects of the transceiver 1425 described with reference to FIG. 14. The transmitter 1115 may include a single antenna, or it may include a plurality of antennas.

Figure 12:
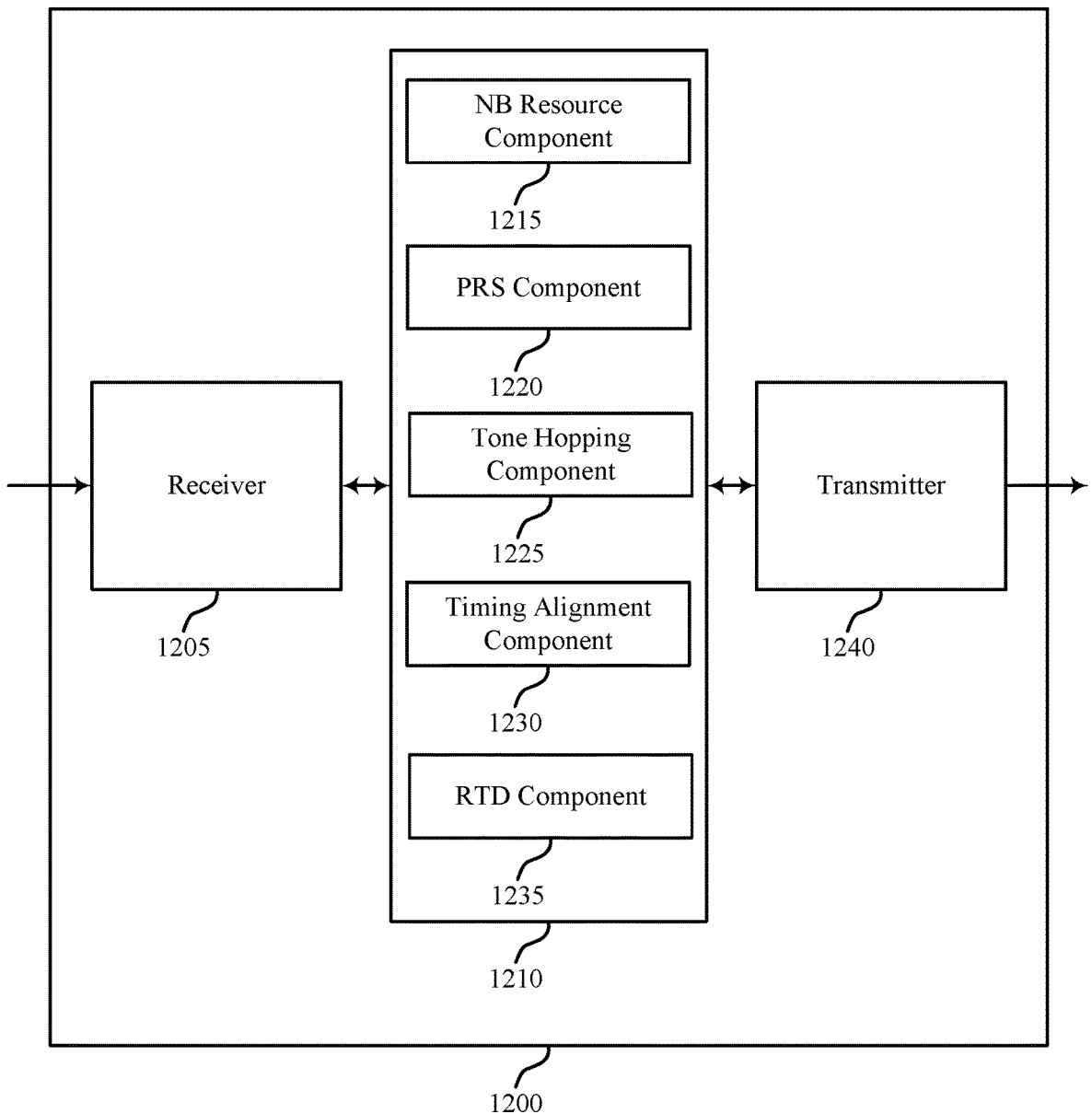

FIG. 12 shows a block diagram of a wireless device 1200 that supports positioning signals for narrowband devices in accordance with various aspects of the present disclosure. Wireless device 1200 may be an example of aspects of a wireless device 1100 or a base station 105 described with reference to FIGS. 1-6, and 11. Wireless device 1200 may include receiver 1205, base station positioning signal manager 1210 and transmitter 1240. Wireless device 1200 may additionally or alternatively include a processor. Each of these components may be in communication with each other.

The receiver 1205 may receive information which may be passed on to other components of the device. The receiver 1205 may additionally or alternatively perform the functions described with reference to the receiver 1105 of FIG. 11. The receiver 1205 may be an example of aspects of the transceiver 1425 described with reference to FIG. 14.

The base station positioning signal manager 1210 may be an example of aspects of base station positioning signal manager 1110 described with reference to FIG. 11. The base station positioning signal manager 1210 may include NB resource component 1215, PRS component 1220, tone hopping component 1225, timing alignment component 1230 and RTD component 1235. The base station positioning signal manager 1210 may be an example of aspects of the base station positioning signal manager 1405 described with reference to FIG. 14.

The NB resource component 1215 may identify PRS resources within a narrowband transmission bandwidth. In some cases, the narrowband transmission bandwidth is a subset of a wideband transmission bandwidth. In some cases, the PRS resources within the narrowband transmission bandwidth include resources within a single RB of the narrowband transmission bandwidth. In some cases, the PRS resources include wireless transmission resources in a stand-alone narrowband transmission bandwidth that is outside of a wideband system bandwidth, or wireless transmission resources in a guard band bandwidth that is adjacent to the wideband system bandwidth.

In some cases, the single RB of the narrowband transmission bandwidth does not include a CRS. In some cases, a periodicity of PRS transmissions within the narrowband transmission bandwidth is reduced relative to a wideband PRS transmission periodicity. In some cases, the number of consecutive DL subframes with PRS transmission is increased relative to a wideband PRS transmission.

The PRS component 1220 may generate a PRS based at least in part on the identified PRS resources, and transmit, on the PRS resources within the narrowband transmission bandwidth, the PRS in at least one DL subframe among a set of DL subframes.

The tone hopping component 1225 may configure a set of symbols of a DL subframe for PRS transmission, configure, within each of the set of symbols, a single tone as a PRS tone within each symbol based at least in part on a symbol location of each symbol and a tone hopping value, transmit the PRS on the configured tones of the set of symbols, configure a second PRS tone location for a second symbol based at least in part on the first tone hopping value and a first PRS tone location of the first symbol, configure a second tone hopping value for the second symbol, and configure a third PRS tone location for a third symbol based at least in part on the second tone hopping value and the second PRS tone location. In some cases, the configuring the single tone within each symbol includes configuring a first tone hopping value for a first symbol. In some cases, the tone hopping value identifies different tones within consecutive symbols configured as PRS tones.

The timing alignment component 1230 may receive a first UL transmission from a UE, the first UL transmission aligned to DL timing of the UE and including a first CP having a first CP duration, transmit to the UE a timing adjustment for a second UL transmission by the UE, and receive the second UL transmission from the UE, the second UL transmission based at least in part on the timing adjustment and including a second CP having a second CP duration that is less than the first CP duration.

The RTD component 1235 may determine an RTD for transmissions with the UE based at least in part on a time of receipt of the second UL transmission, and receive a set of RTDs associated with the UE from two or more other base stations.

The transmitter 1240 may transmit signals received from other components of wireless device 1200. In some examples, the transmitter 1240 may be collocated with a receiver in a transceiver module. For example, the transmitter 1240 may be an example of aspects of the transceiver 1425 described with reference to FIG. 14. The transmitter 1240 may utilize a single antenna, or it may utilize a plurality of antennas.

Figure 13:
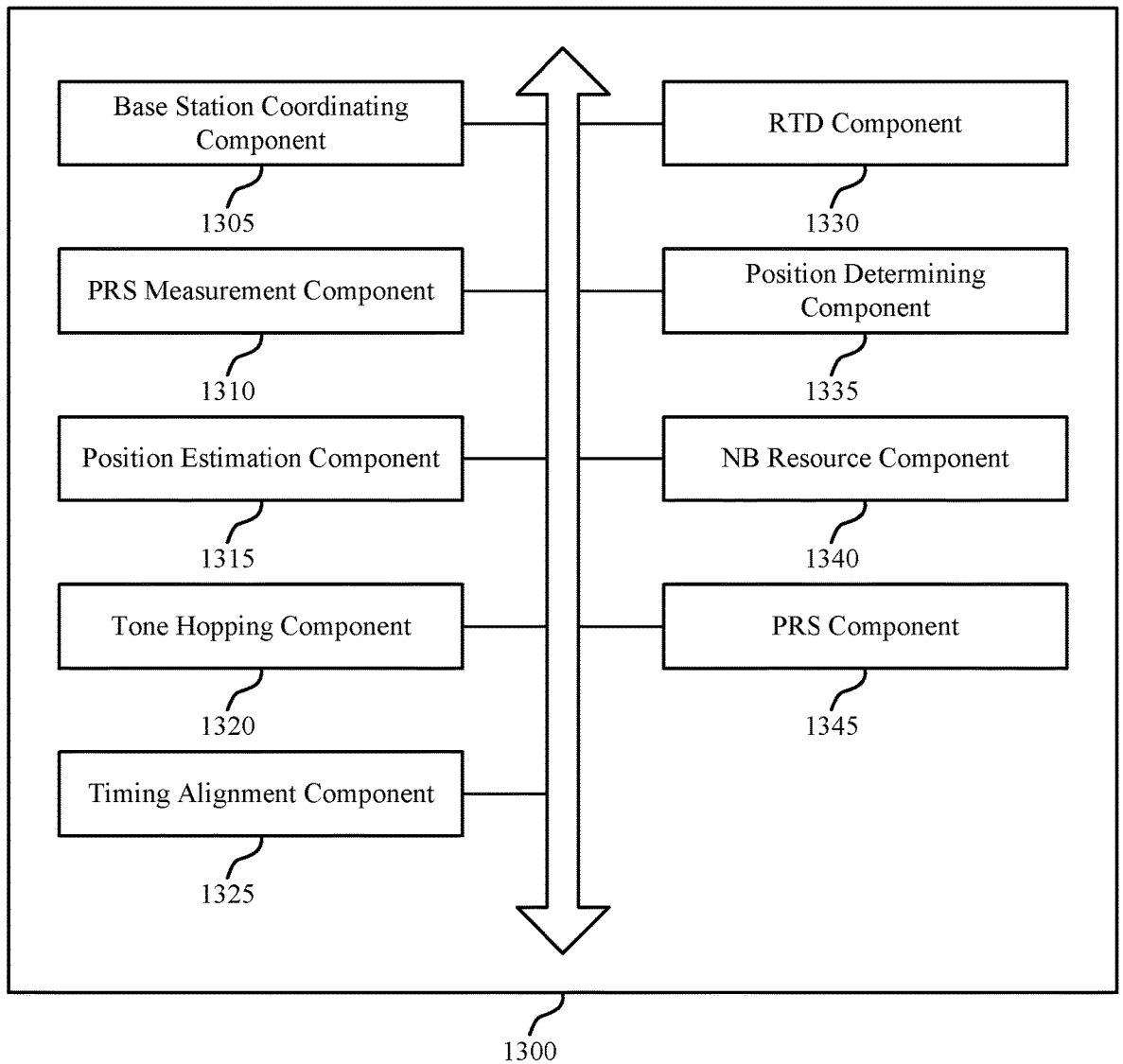

FIG. 13 shows a block diagram of a base station positioning signal manager 1300 which may be an example of the corresponding component of wireless device 1100 or wireless device 1200. That is, base station positioning signal manager 1300 may be an example of aspects of base station positioning signal manager 1110 or base station positioning signal manager 1210 described with reference to FIGS. 11 and 12. The base station positioning signal manager 1300 may additionally or alternatively be an example of aspects of the base station positioning signal manager 1405 described with reference to FIG. 14.

The base station positioning signal manager 1300 may include base station coordinating component 1305, PRS measurement component 1310, position estimation component 1315, tone hopping component 1320, timing alignment component 1325, RTD component 1330, position determining component 1335, NB resource component 1340 and PRS component 1345. Each of these modules may communicate, directly or indirectly, with one another (e.g., via one or more buses).

The base station coordinating component 1305 may coordinate with one or more base stations to mute transmissions of the one or more other base stations during the transmission of the single RB.

The PRS measurement component 1310 may receive a first measurement associated with the PRS from a UE, and receive a second measurement associated with one or more other downlink channel signals received at the UE. In some cases, the one or more other downlink channel signals includes one or more of a PSS, a SSS, a PBCH signal, or a SIB signal. In some cases, the second measurement includes a PDP based at least in part on a non-coherent combining of the one or more other downlink channel signals with the PRS transmission. In some cases, the second measurement may include a weighting factor to be applied when combining PRS measurements. The position estimation component 1315 may estimate a position of the UE based at least in part on the first measurement and the second measurement.

The tone hopping component 1320 may configure a set of symbols of a DL subframe for PRS transmission, configure, within each of the set of symbols, a single tone as a PRS tone within each symbol based at least in part on a symbol location of each symbol and a tone hopping value, transmit the PRS on the configured tones of the set of symbols, configure a second PRS tone location for a second symbol based at least in part on the first tone hopping value and a first PRS tone location of the first symbol, configure a second tone hopping value for the second symbol, and configure a third PRS tone location for a third symbol based at least in part on the second tone hopping value and the second PRS tone location.

The timing alignment component 1325 may receive a first UL transmission from a UE, the first UL transmission aligned to DL timing of the UE and including a first CP having a first CP duration, transmit to the UE a timing adjustment for a second UL transmission by the UE, and receive the second UL transmission from the UE, the second UL transmission based at least in part on the timing adjustment and including a second CP having a second CP duration that is less than the first CP duration.

The RTD component 1330 may determine an RTD for transmissions with the UE based at least in part on a time of receipt of the second UL transmission, and receive a set of RTDs associated with the UE from two or more other base stations. The position determining component 1335 may determine a position of the UE based at least in part on the set of RTDs and a known position of the two or more other base stations, and receive one or more PRS-based measurements from the UE, and wherein the determining the position of the UE is additionally or alternatively based at least in part on the PRS-based measurements.

The NB resource component 1340 may PRS resources within a narrowband transmission bandwidth. The PRS component 1345 may generate a PRS based at least in part on the identified PRS resources, and transmit, on the PRS resources within the narrowband transmission bandwidth, the PRS in at least one DL subframe among a set of DL subframes.

Figure 14:
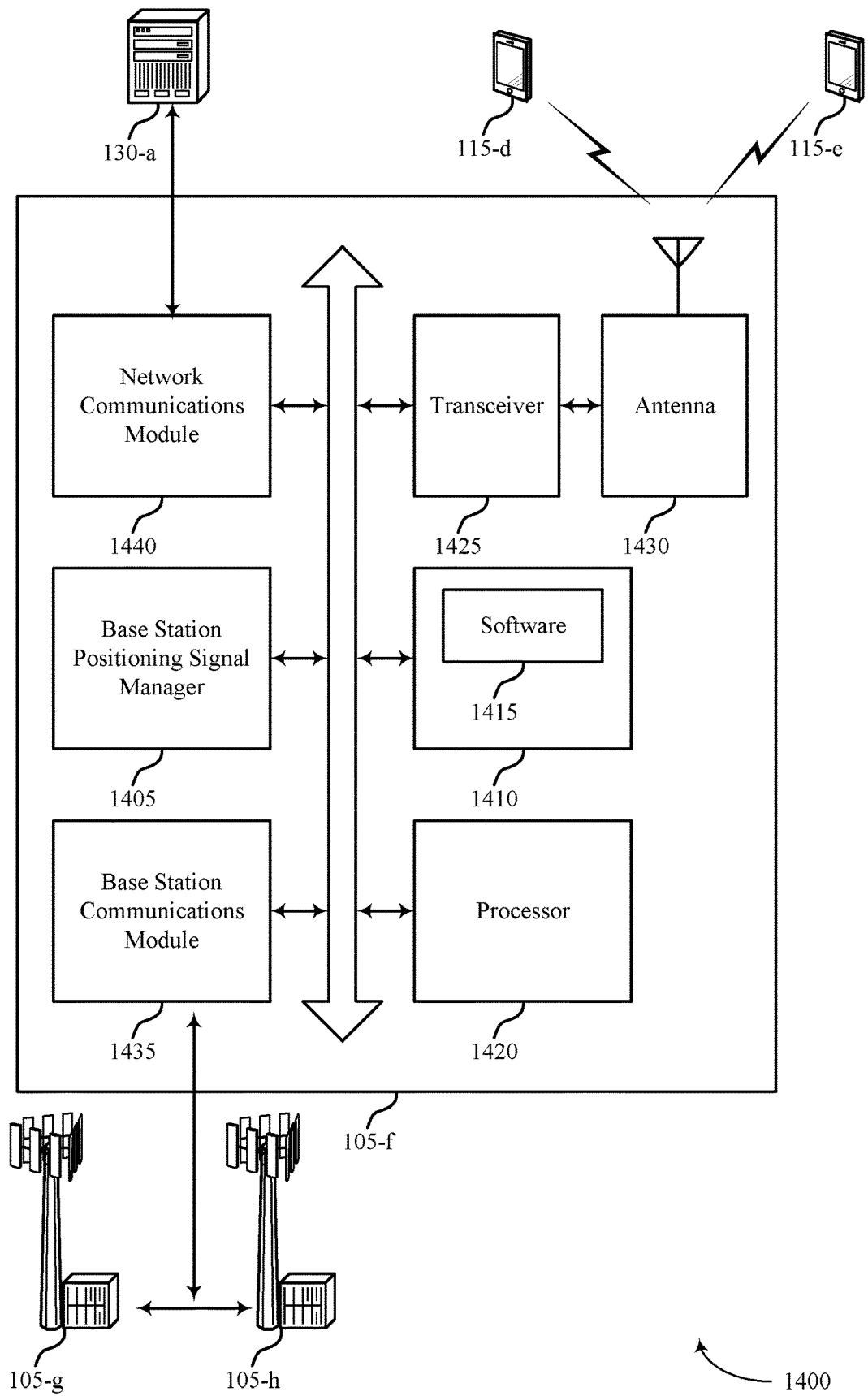
FIG. 14 illustrates a block diagram of a system including a base station that supports positioning signals for narrowband devices in accordance with aspects of the present disclosure.

FIG. 14 shows a diagram of a wireless system 1400 including a device configured that supports positioning signals for narrowband devices in accordance with various aspects of the present disclosure. For example, system 1400 may include base station 105-*f*, which may be an example of a wireless device 1100, a wireless device 1200, or a base station 105 as described with reference to FIGS. 1-6, and 11-13. Base station 105-*f* may additionally or alternatively include components for bi-directional voice and data communications including components for transmitting communications and components for receiving communications. For example, base station 105-*f* may communicate bi-directionally with one or more UEs 115.

Base station 105-*f* may additionally or alternatively include base station positioning signal manager 1405, memory 1410, processor 1420, transceiver 1425, antenna 1430, base station communications module 1435 and network communications module 1440. Each of these modules may communicate, directly or indirectly, with one another (e.g., via one or more buses). The base station positioning signal manager 1405 may be an example of a base station positioning signal manager as described with reference to FIGS. 11 through 13.

The memory 1410 may include RAM and ROM. The memory 1410 may store computer-readable, computer-executable software including instructions that, when executed, cause the processor to perform various functions described herein (e.g., positioning signals for narrowband devices, etc.). In some cases, the software 1415 may not be directly executable by the processor but may cause a computer (e.g., when compiled and executed) to perform functions described herein. The processor 1420 may include an intelligent hardware device, (e.g., a CPU, a microcontroller, an ASIC, etc.)

The transceiver 1425 may communicate bi-directionally, via one or more antennas, wired, or wireless links, with one or more networks, as described above. For example, the transceiver 1425 may communicate bi-directionally with a base station 105 or a UE 115. The transceiver 1425 may additionally or alternatively include a modem to modulate the packets and provide the modulated packets to the antennas for transmission, and to demodulate packets received from the antennas. In some cases, the wireless device may include a single antenna 1430. However, in some cases the device may have more than one antenna 1030, which may be capable of concurrently transmitting or receiving multiple wireless transmissions.

The base station communications module 1435 may manage communications with other base station 105, and may include a controller or scheduler for controlling communications with UEs 115 in cooperation with other base stations 105. For example, the base station communications module 1435 may coordinate scheduling for transmissions to UEs 115 for various interference mitigation techniques such as beamforming or joint transmission. In some examples, base station communications module-95 may provide an X2 interface within an LTE/LTE-A wireless communication network technology to provide communication between base stations 105.

The network communications module 1440 may manage communications with the core network (e.g., via one or more wired backhaul links). For example, the network communications module 1440 may manage the transfer of data communications for client devices, such as one or more UEs 115.

Figure 15:
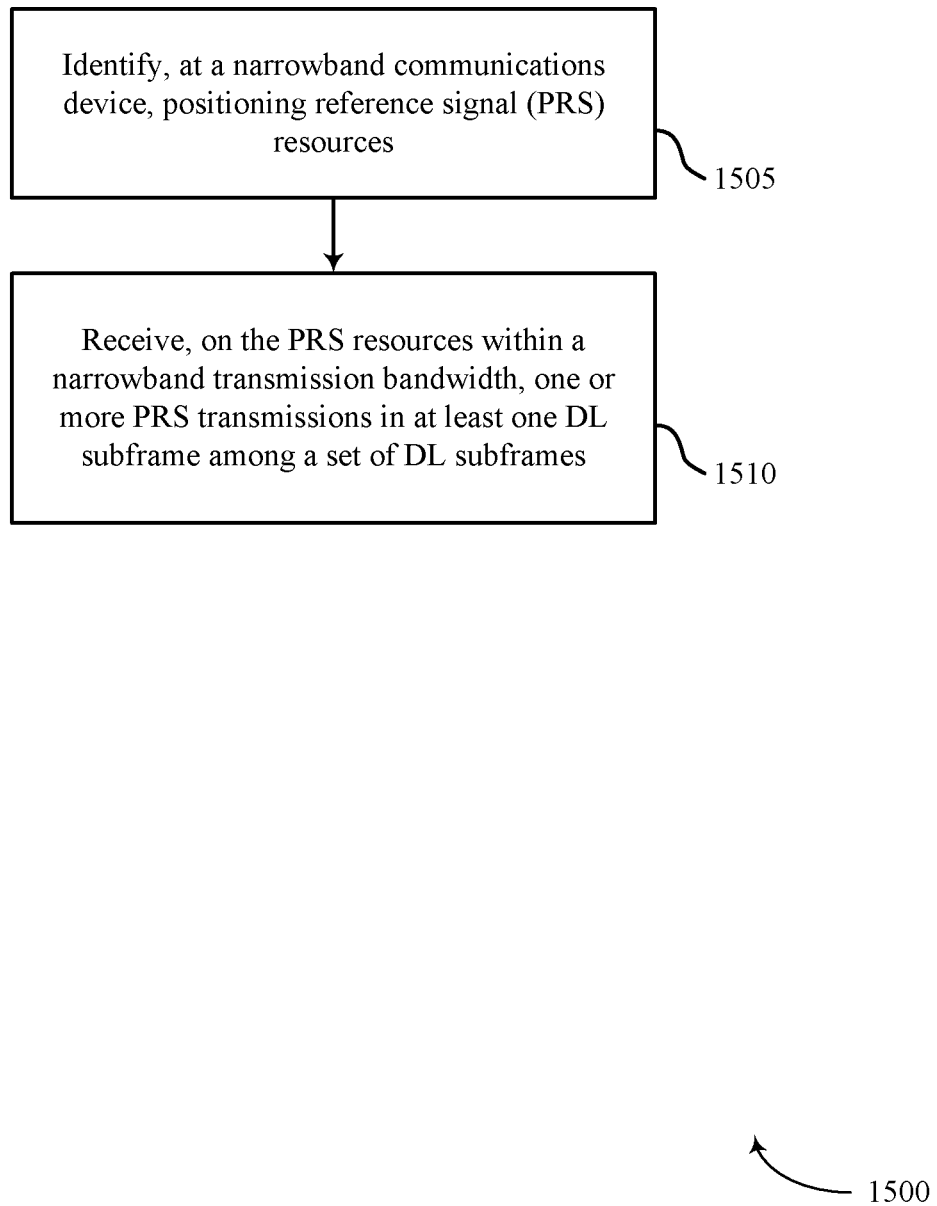
FIGS. 15 through 22 illustrate methods for positioning signals for narrowband devices in accordance with aspects of the present disclosure.

FIG. 15 shows a flowchart illustrating a method 1500 for positioning signals for narrowband devices in accordance with various aspects of the present disclosure. The operations of method 1500 may be implemented by a device such as a UE 115 or its components as described with reference to FIGS. 1-6. For example, the operations of method 1500 may be performed by the positioning signal manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may identify PRS resources within a transmission bandwidth as described above with reference to FIGS. 2 through 6. In some examples, the operations of block 1505 may be performed by the NB resource component as described with reference to FIGS. 8 and 9.

At block 1510, the UE 115 may receive, on the PRS resources within a narrowband transmission bandwidth, one or more PRS transmissions in at least one DL subframe among a set of DL subframes as described above with reference to FIGS. 2 through 6. In some examples, the operations of block 1510 may be performed by the NB PRS component as described with reference to FIGS. 8 and 9.

Figure 16:
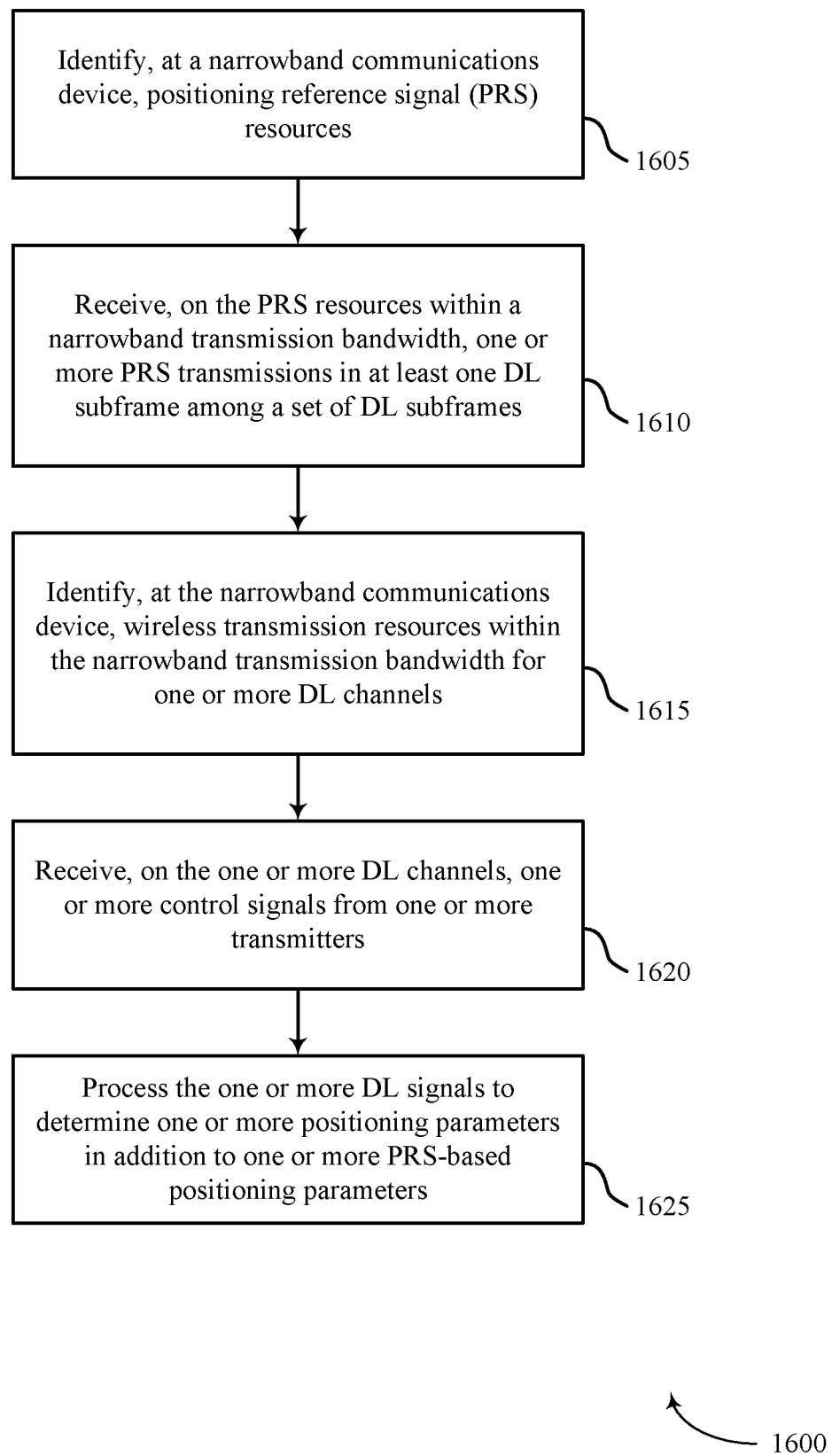

FIG. 16 shows a flowchart illustrating a method 1600 for positioning signals for narrowband devices in accordance with various aspects of the present disclosure. The operations of method 1600 may be implemented by a device such as a UE 115 or its components as described with reference to FIGS. 1-6. For example, the operations of method 1600 may be performed by the positioning signal manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may identify PRS resources as described above with reference to FIGS. 2 through 6. In some examples, the operations of block 1605 may be performed by the NB resource component as described with reference to FIGS. 8 and 9.

At block 1610, the UE 115 may receive, on the PRS resources within a narrowband transmission bandwidth, one or more PRS transmissions in at least one DL subframe among a set of DL subframes as described above with reference to FIGS. 2 through 6. In some examples, the operations of block 1610 may be performed by the NB PRS component as described with reference to FIGS. 8 and 9.

At block 1615, the UE 115 may identify wireless transmission resources within the narrowband transmission bandwidth for one or more downlink channels as described above with reference to FIGS. 2 through 6. In some examples, the operations of block 1615 may be performed by the downlink channel component as described with reference to FIGS. 8 and 9.

At block 1620, the UE 115 may receive, on the one or more downlink channels, one or more downlink signals from one or more transmitters as described above with reference to FIGS. 2 through 6. In some examples, the operations of block 1620 may be performed by the downlink channel component as described with reference to FIGS. 8 and 9.

At block 1625, the UE 115 may process the one or more downlink signals to determine one or more positioning parameters in addition to one or more PRS-based positioning parameters as described above with reference to FIGS. 2 through 6. In some examples, the operations of block 1625 may be performed by the downlink channel component as described with reference to FIGS. 8 and 9.

Figure 17:
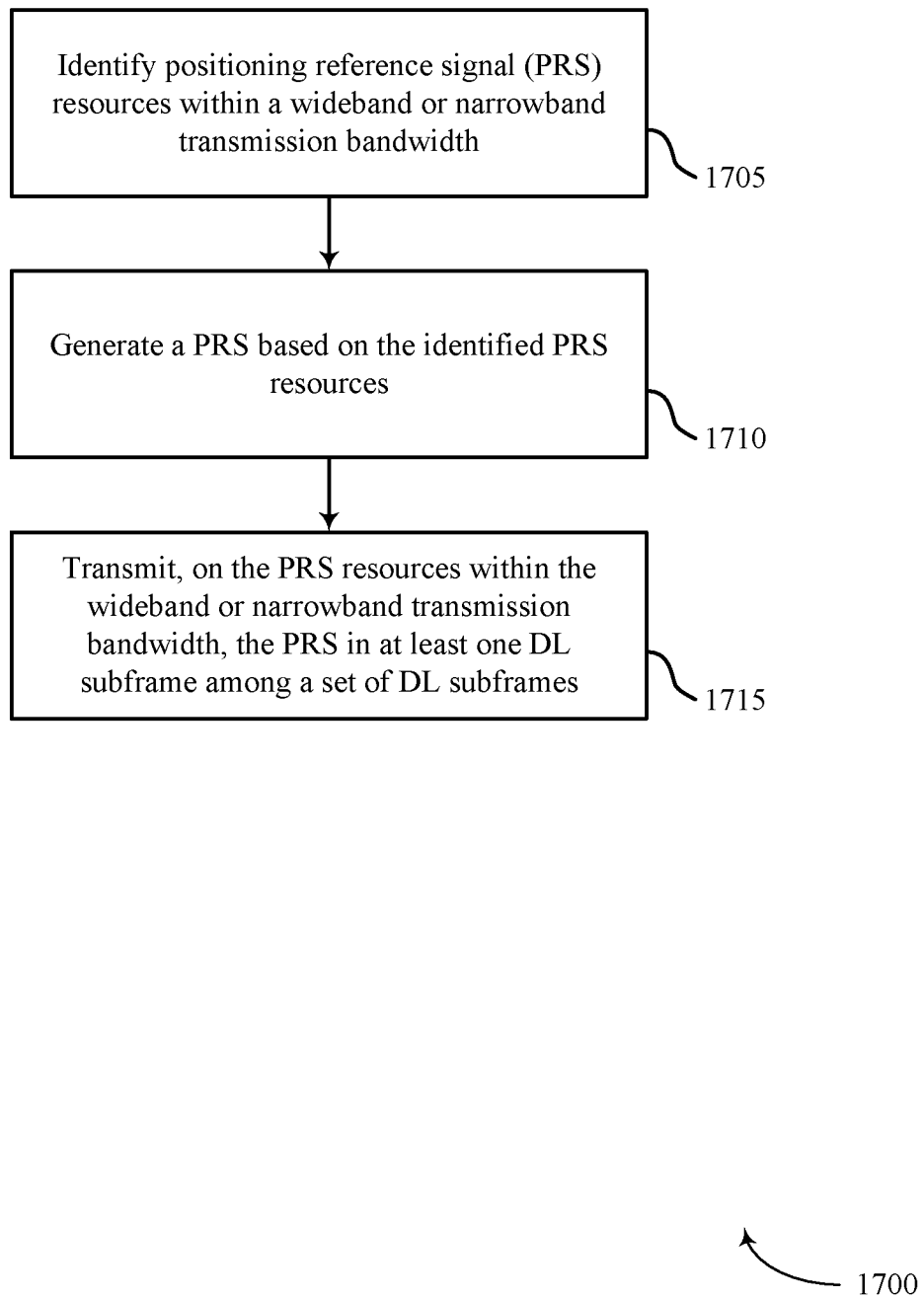

FIG. 17 shows a flowchart illustrating a method 1700 for positioning signals for narrowband devices in accordance with various aspects of the present disclosure. The operations of method 1700 may be implemented by a device such as a base station 105 or its components as described with reference to FIGS. 1 and 2. For example, the operations of method 1700 may be performed by the base station positioning signal manager as described herein. In some examples, the base station 105 may execute a set of codes to control the functional elements of the device to perform the functions described below. Additionally or alternatively, the base station 105 may perform aspects the functions described below using special-purpose hardware.

At block 1705, the base station 105 may PRS resources within a wideband or narrowband transmission bandwidth as described above with reference to FIGS. 2 through 6. In some examples, the operations of block 1705 may be performed by the NB resource component as described with reference to FIGS. 12 and 13.

At block 1710, the base station 105 may generate a PRS based at least in part on the identified PRS resources as described above with reference to FIGS. 2 through 6. In some examples, the operations of block 1710 may be performed by the PRS component as described with reference to FIGS. 12 and 13.

At block 1715, the base station 105 may transmit, on the PRS resources within the wideband or narrowband transmission bandwidth, the PRS in at least one DL subframe among a set of DL subframes as described above with reference to FIGS. 2 through 6. In some examples, the operations of block 1715 may be performed by the PRS component as described with reference to FIGS. 12 and 13.

Figure 18:
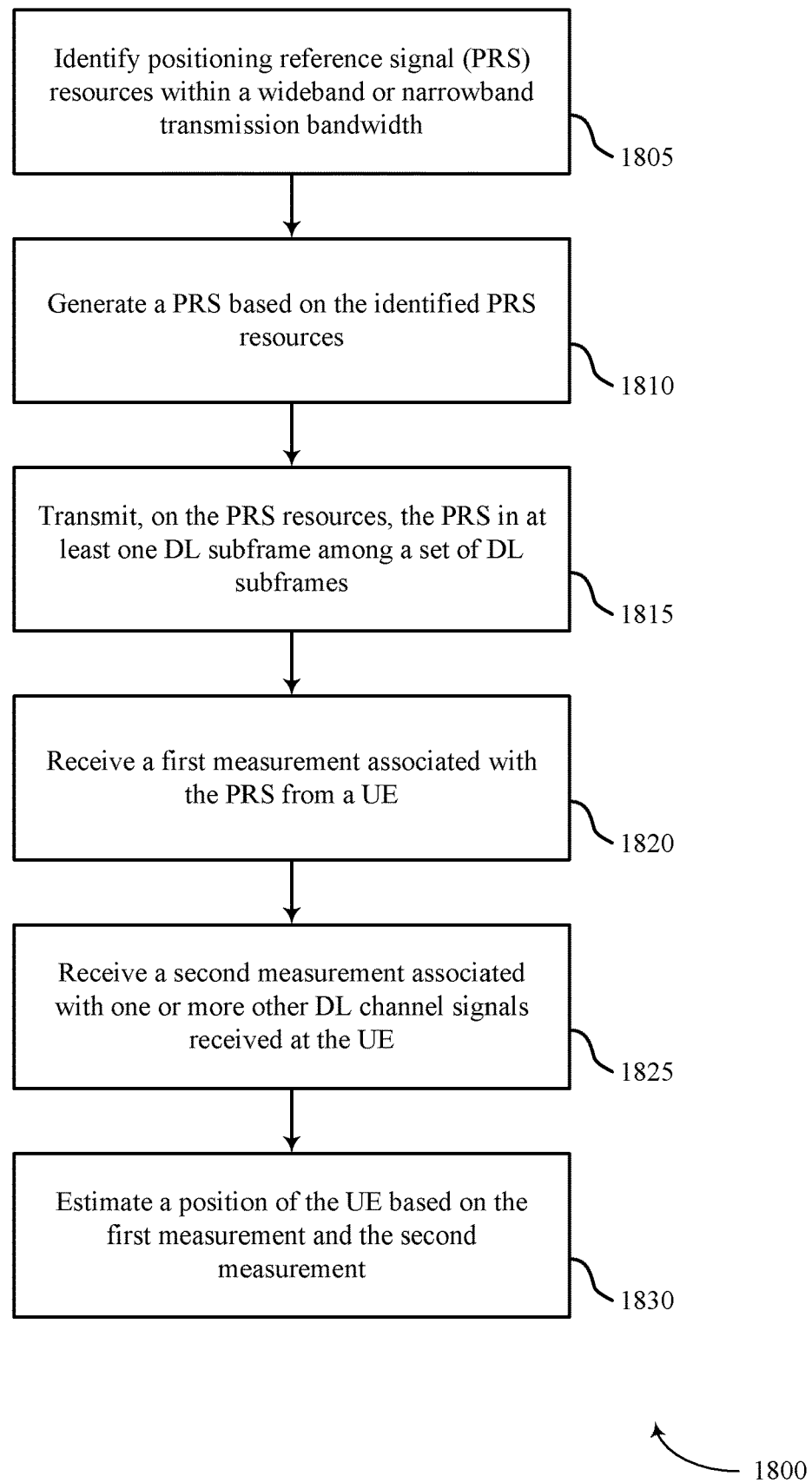

FIG. 18 shows a flowchart illustrating a method 1800 for positioning signals for narrowband devices in accordance with various aspects of the present disclosure. The operations of method 1800 may be implemented by a device such as a base station 105 or its components as described with reference to FIGS. 1-6. For example, the operations of method 1800 may be performed by the base station positioning signal manager as described herein. In some examples, the base station 105 may execute a set of codes to control the functional elements of the device to perform the functions described below. Additionally or alternatively, the base station 105 may perform aspects the functions described below using special-purpose hardware.

At block 1805, the base station 105 may identify PRS resources within a narrowband transmission bandwidth as described above with reference to FIGS. 2 through 6. In some examples, the operations of block 1805 may be performed by the NB resource component as described with reference to FIGS. 12 and 13.

At block 1810, the base station 105 may generate a PRS based at least in part on the identified PRS resources as described above with reference to FIGS. 2 through 6. In some examples, the operations of block 1810 may be performed by the PRS component as described with reference to FIGS. 12 and 13.

At block 1815, the base station 105 may transmit, on the PRS resources within the narrowband transmission bandwidth, the PRS in at least one DL subframe among a set of DL subframes as described above with reference to FIGS. 2 through 6. In some examples, the operations of block 1815 may be performed by the PRS component as described with reference to FIGS. 12 and 13.

At block 1820, the base station 105 may receive a first measurement associated with the PRS from a UE as described above with reference to FIGS. 2 through 6. In some examples, the operations of block 1820 may be performed by the PRS measurement component as described with reference to FIGS. 12 and 13.

At block 1825, the base station 105 may receive a second measurement associated with one or more other downlink channel signals received at the UE as described above with reference to FIGS. 2 through 6. In some examples, the operations of block 1825 may be performed by the PRS measurement component as described with reference to FIGS. 12 and 13.

At block 1830, the base station 105 may estimate a position of the UE based at least in part on the first measurement and the second measurement as described above with reference to FIGS. 2 through 6. In some examples, the operations of block 1830 may be performed by the position estimation component as described with reference to FIGS. 12 and 13.

Figure 19:
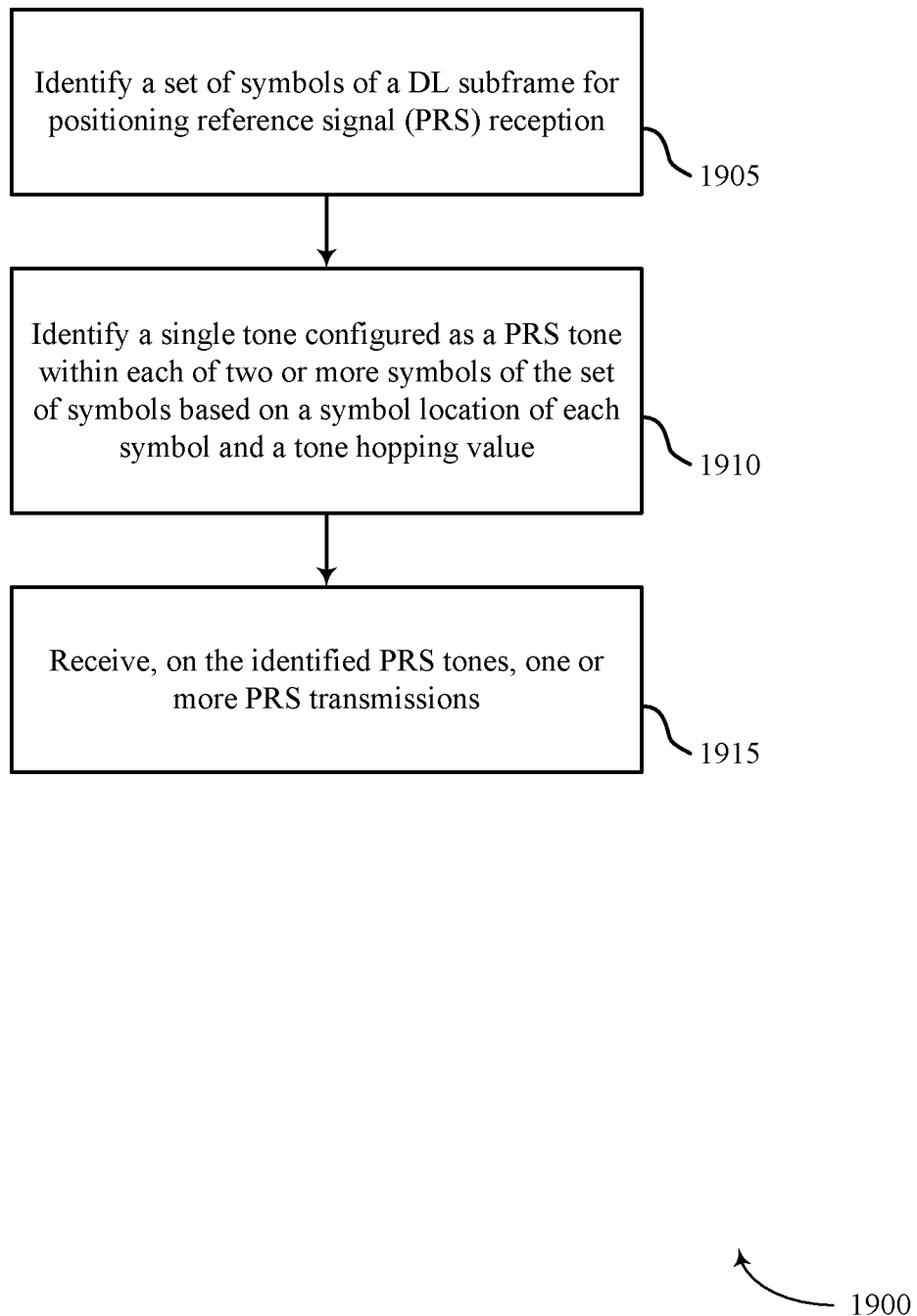

FIG. 19 shows a flowchart illustrating a method 1900 for positioning signals for narrowband devices in accordance with various aspects of the present disclosure. The operations of method 1900 may be implemented by a device such as a UE 115 or its components as described with reference to FIGS. 1-6. For example, the operations of method 1900 may be performed by the positioning signal manager as described herein. In some examples, the UE 115 may execute a set of codes to control the functional elements of the device to perform the functions described below. Additionally or alternatively, the UE 115 may perform aspects the functions described below using special-purpose hardware.

At block 1905, the UE 115 may identify a set of symbols of a DL subframe for PRS reception as described above with reference to FIGS. 2 through 6. In some examples, the operations of block 1905 may be performed by the tone hopping component as described with reference to FIGS. 8 and 9.

At block 1910, the UE 115 may identify a single tone configured as a PRS tone within each of two or more symbols of the set of symbols based at least in part on a symbol location of each symbol and a tone hopping value as described above with reference to FIGS. 2 through 6. In some examples, the operations of block 1910 may be performed by the tone hopping component as described with reference to FIGS. 8 and 9.

At block 1915, the UE 115 may receive, on the identified PRS tones, one or more PRS transmissions as described above with reference to FIGS. 2 through 6. In some examples, the operations of block 1915 may be performed by the tone hopping component as described with reference to FIGS. 8 and 9.

Figure 20:
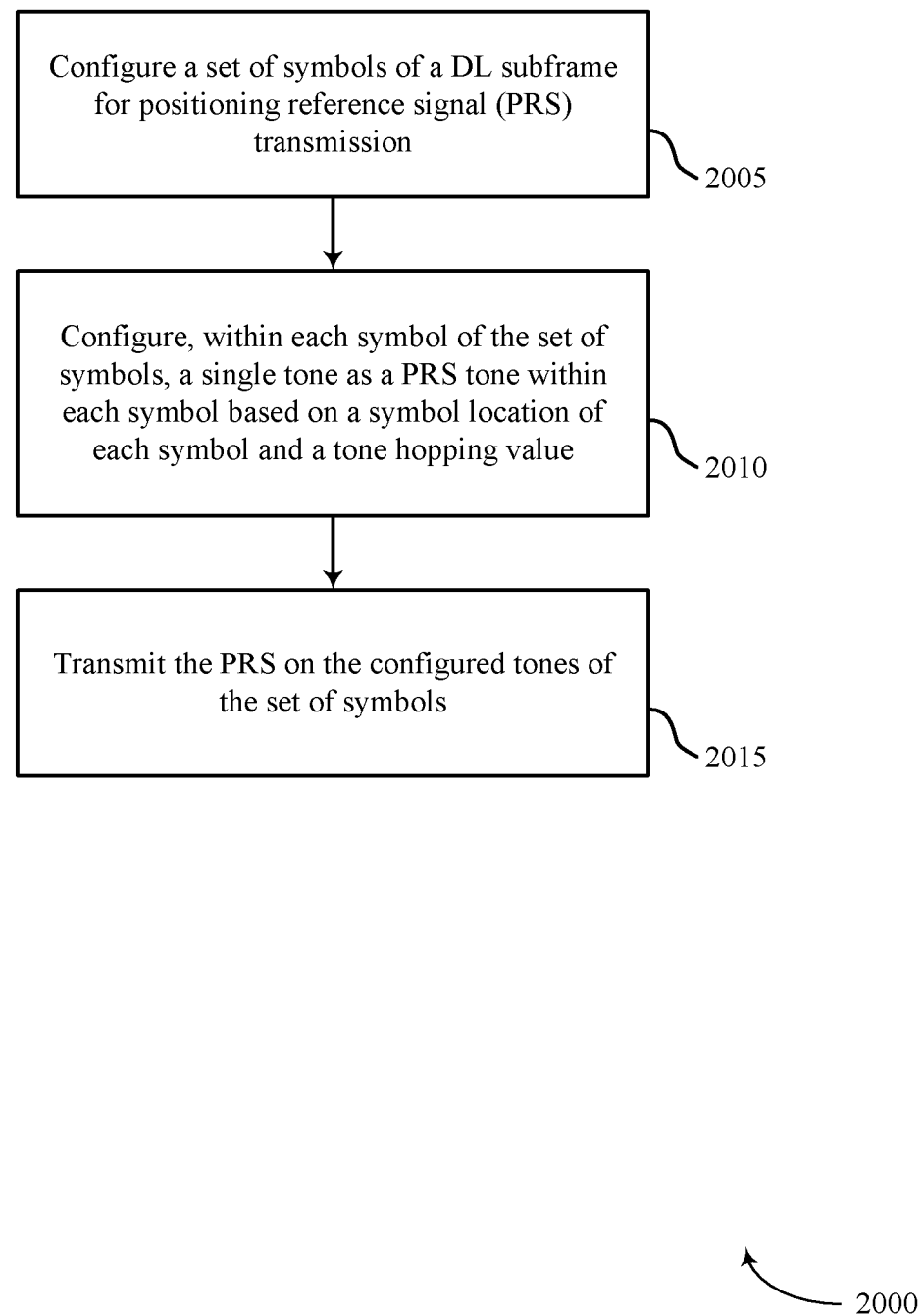

FIG. 20 shows a flowchart illustrating a method 2000 for positioning signals for narrowband devices in accordance with various aspects of the present disclosure. The operations of method 2000 may be implemented by a device such as a base station 105 or its components as described with reference to FIGS. 1-6. For example, the operations of method 2000 may be performed by the base station positioning signal manager as described herein. In some examples, the base station 105 may execute a set of codes to control the functional elements of the device to perform the functions described below. Additionally or alternatively, the base station 105 may perform aspects the functions described below using special-purpose hardware.

At block 2005, the base station 105 may configure a set of symbols of a DL subframe for PRS transmission as described above with reference to FIGS. 2 through 6. In some examples, the operations of block 2005 may be performed by the tone hopping component as described with reference to FIGS. 12 and 13.

At block 2010, the base station 105 may configure, within each of the set of symbols, a single tone as a PRS tone within each symbol based at least in part on a symbol location of each symbol and a tone hopping value as described above with reference to FIGS. 2 through 6. In some examples, the operations of block 2010 may be performed by the tone hopping component as described with reference to FIGS. 12 and 13.

At block 2015, the base station 105 may transmit the PRS on the configured tones of the set of symbols as described above with reference to FIGS. 2 through 6. In some examples, the operations of block 2015 may be performed by the tone hopping component as described with reference to FIGS. 12 and 13.

Figure 21:
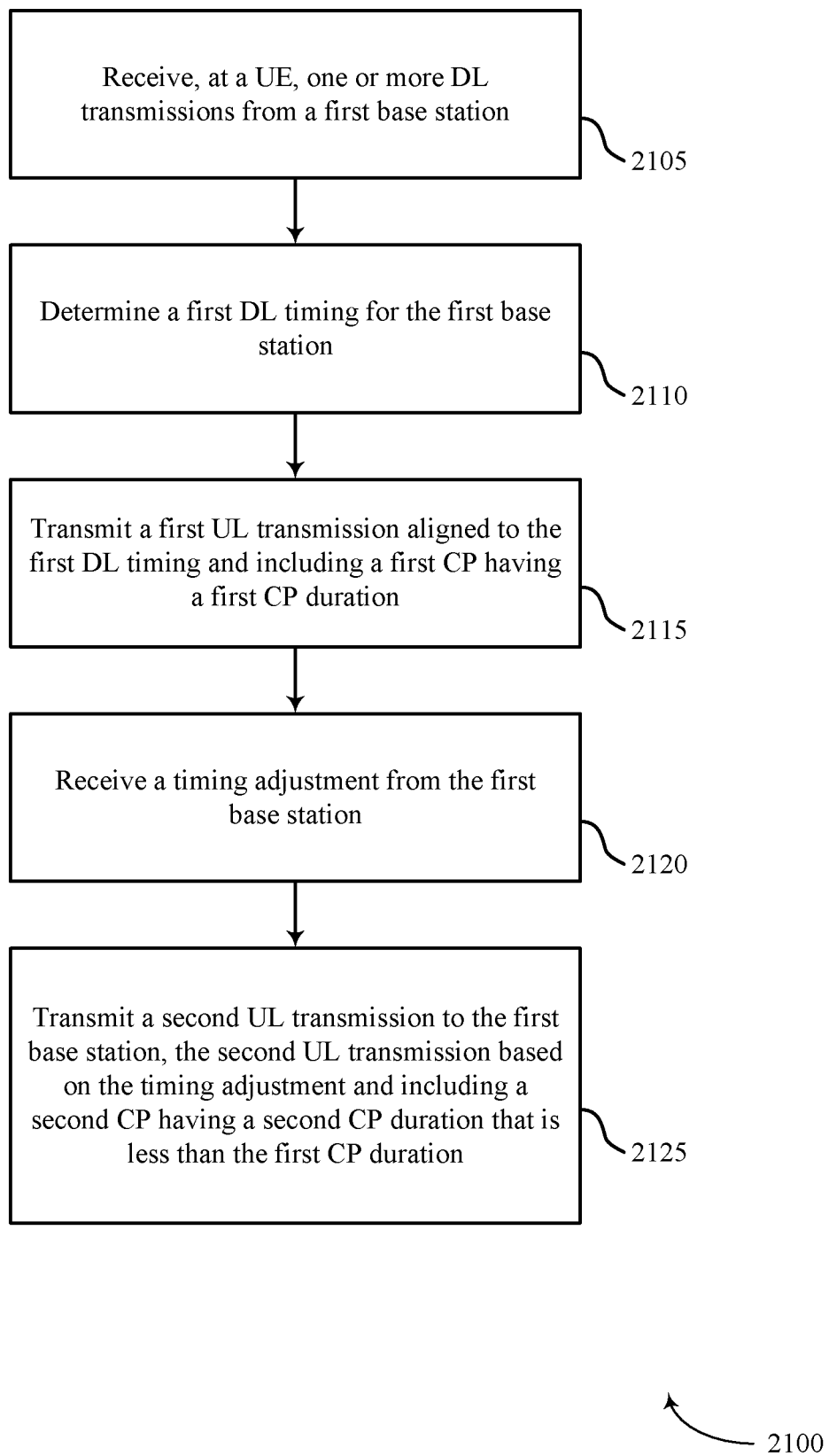

FIG. 21 shows a flowchart illustrating a method 2100 for positioning signals for narrowband devices in accordance with various aspects of the present disclosure. The operations of method 2100 may be implemented by a device such as a UE 115 or its components as described with reference to FIGS. 1-6. For example, the operations of method 2100 may be performed by the positioning signal manager as described herein. In some examples, the UE 115 may execute a set of codes to control the functional elements of the device to perform the functions described below. Additionally or alternatively, the UE 115 may perform aspects the functions described below using special-purpose hardware.

At block 2105, the UE 115 may receive one or more DL transmissions from a first base station as described above with reference to FIGS. 2 through 6. In some examples, the operations of block 2105 may be performed by the timing alignment component as described with reference to FIGS. 8 and 9.

At block 2110, the UE 115 may determine a first DL timing for the first base station as described above with reference to FIGS. 2 through 6. In some examples, the operations of block 2110 may be performed by the timing alignment component as described with reference to FIGS. 8 and 9.

At block 2115, the UE 115 may transmit a first UL transmission aligned to the first DL timing and including a first CP having a first CP duration as described above with reference to FIGS. 2 through 6. In some examples, the operations of block 2115 may be performed by the timing alignment component as described with reference to FIGS. 8 and 9.

At block 2120, the UE 115 may receive a timing adjustment from the first base station as described above with reference to FIGS. 2 through 6. In some examples, the operations of block 2120 may be performed by the timing alignment component as described with reference to FIGS. 8 and 9.

At block 2125, the UE 115 may transmit a second UL transmission to the first base station, the second UL transmission based at least in part on the timing adjustment and including a second CP having a second CP duration that is less than the first CP duration as described above with reference to FIGS. 2 through 6. In some examples, the operations of block 2125 may be performed by the timing alignment component as described with reference to FIGS. 8 and 9.

Figure 22:
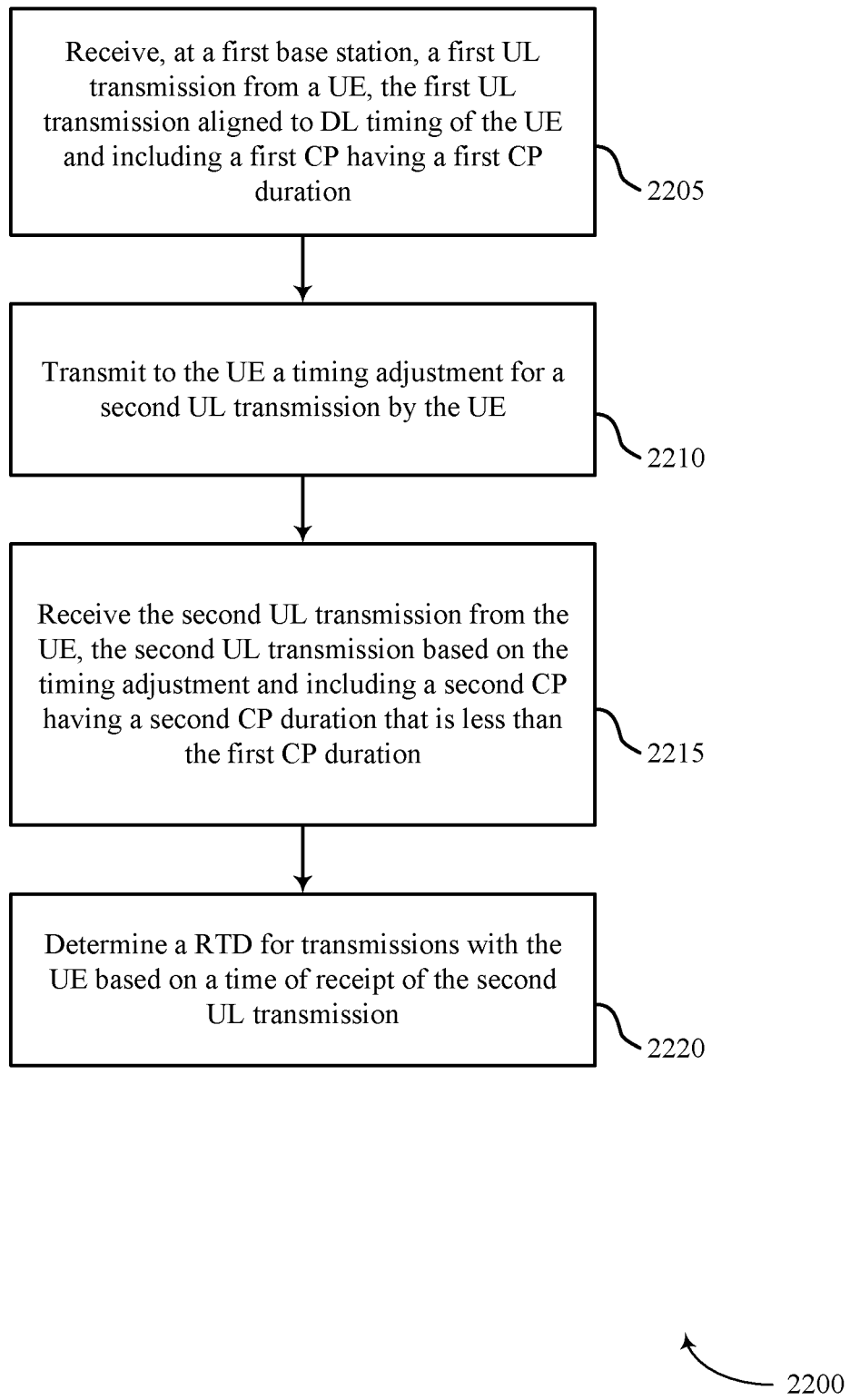

FIG. 22 shows a flowchart illustrating a method 2200 for positioning signals for narrowband devices in accordance with various aspects of the present disclosure. The operations of method 2200 may be implemented by a device such as a base station 105 or its components as described with reference to FIGS. 1-6. For example, the operations of method 2200 may be performed by the base station positioning signal manager as described herein. In some examples, the base station 105 may execute a set of codes to control the functional elements of the device to perform the functions described below. Additionally or alternatively, the base station 105 may perform aspects the functions described below using special-purpose hardware.

At block 2205, the base station 105 may receive a first UL transmission from a UE, the first UL transmission aligned to DL timing of the UE and including a first CP having a first CP duration as described above with reference to FIGS. 2 through 6. In some examples, the operations of block 2205 may be performed by the timing alignment component as described with reference to FIGS. 12 and 13.

At block 2210, the base station 105 may transmit to the UE a timing adjustment for a second UL transmission by the UE as described above with reference to FIGS. 2 through 6.

In some examples, the operations of block 2210 may be performed by the timing alignment component as described with reference to FIGS. 12 and 13.

At block 2215, the base station 105 may receive the second UL transmission from the UE, the second UL transmission based at least in part on the timing adjustment and including a second CP having a second CP duration that is less than the first CP duration as described above with reference to FIGS. 2 through 6. In some examples, the operations of block 2215 may be performed by the timing alignment component as described with reference to FIGS. 12 and 13.

At block 2220, the base station 105 may determine an RTD for transmissions with the UE based at least in part on a time of receipt of the second UL transmission as described above with reference to FIGS. 2 through 6. In some examples, the operations of block 2220 may be performed by the RTD component as described with reference to FIGS. 12 and 13.

In some examples, aspects from two or more of the methods 1500, 1600, 1700, 1800, 1900, 2000, 2100, or 2200 may be combined as described with reference to FIG. 15, 16, 17, 18, 19, 20, 21, or 22. It should be noted that the methods 1500, 1600, 1700, 1800, 1900, 2000, 2100, and 2200 are just example implementations, and that the operations of the methods 1500, 1600, 1700, 1800, 1900, 2000, 2100, or 2200 may be rearranged or otherwise modified such that other implementations are possible. For example, aspects of each of the methods may include steps or aspects of the other methods, or other steps or techniques described herein. Thus, aspects of the disclosure may provide for positioning signals for narrowband devices.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Additionally or alternatively, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are additionally or alternatively included within the scope of computer-readable media.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may additionally or alternatively cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may additionally or alternatively be called forward link transmissions while the UL transmissions may additionally or alternatively be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for positioning signals for narrowband devices. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may additionally or alternatively be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may additionally or alternatively be implemented, in whole or in part, with instructions embodied in a memory, formatted to be executed by one or more general or application-specific processors.

What is claimed is:

1. A method for wireless communication, comprising:
identifying, at a narrowband communications device, positioning reference signal (PRS) resources within a standalone narrowband transmission bandwidth that is outside of a wideband system bandwidth or in a guard band bandwidth that is adjacent to the wideband system bandwidth; and
receiving, on the PRS resources within the standalone narrowband transmission bandwidth or the guard band bandwidth, one or more PRS transmissions in at least one downlink subframe among a plurality of downlink subframes, the one or more PRS transmissions being received within each of a first through third symbol in time of a resource block (RB) in a first slot in time of the at least one downlink subframe.

2. The method of claim 1, wherein a PRS bandwidth of the one or more PRS transmissions is different than the narrowband transmission bandwidth, and wherein the identifying comprises:
    identifying a RB index within the PRS bandwidth that is different than an RB index of the PRS resources within the narrowband transmission bandwidth; and
    determining a PRS sequence based at least in part on the RB index within the PRS bandwidth.

3. The method of claim 2, wherein the PRS bandwidth is greater than the narrowband transmission bandwidth and less than or equal to a wideband system bandwidth of a transmitter that transmits the one or more PRS transmissions.

4. The method of claim 1, wherein the receiving comprises:
    sampling signals received in the PRS resources at a higher sampling rate than sampling of other signals received in the plurality of downlink subframes.

5. The method of claim 1, wherein the receiving comprises:
    receiving a plurality of RBs in a plurality of narrowband transmission bandwidths in the at least one downlink subframe; and
    serially processing the plurality of RBs to determine one or more positioning parameters associated with the one or more PRS transmissions.

6. The method of claim 5, wherein the one or more positioning parameters include one or more of a reference signal time difference (RSTD) measurement between PRS transmissions of two or more transmitters, a reference signal strength indicator (RSSI) of one or more of the PRS transmissions, or an observed time difference of arrival (OTDA) between PRS transmissions of two or more transmitters.

7. The method of claim 1, wherein the identifying further comprises:
    identifying a cyclic prefix (CP) length of the one or more PRS transmissions based at least in part on a type of subframe at least one downlink subframe.

8. The method of claim 7, wherein the CP length is identified as an extended CP length when the type of subframe is a Multimedia Broadcast Single Frequency Network (MBSFN) subframe.

9. The method of claim 1, wherein the RB of the narrowband transmission bandwidth does not include one or more of a cell-specific reference signal (CRS) or PRS transmissions from multiple transmitters.

10. The method of claim 1, wherein the receiving one or more PRS transmissions comprises:
    receiving a first RB having a PRS transmission from a first base station and a second RB having a PRS transmission from a second base station, the first base station and the second base station transmitting the associated PRS in different RBs to reduce interference between the first base station and the second base station.

11. The method of claim 1, wherein a periodicity of PRS transmissions within the narrowband transmission bandwidth is reduced relative to a wideband PRS transmission periodicity.

12. The method of claim 1, wherein a number of consecutive downlink subframes with PRS transmissions is increased relative to a wideband PRS transmission.

13. The method of claim 1, wherein one or more transmitters other than a transmitter transmitting the RB mute transmissions during the transmission of the RB.

14. The method of claim 1, wherein the identifying comprises:
    identifying a first PRS bandwidth in a first downlink subframe of the plurality of downlink subframes as being within a wideband system bandwidth of one or more transmitters that transmit the PRS transmissions; and
    identifying a second PRS bandwidth in a second downlink subframe of the plurality of downlink subframes as being within a subset of the wideband system bandwidth.

15. The method of claim 1, wherein the identifying comprises:
    identifying a first PRS bandwidth in a first downlink subframe of the plurality of downlink subframes as being within a first subset of a wideband system bandwidth of one or more transmitters that transmit the PRS transmissions; and
    identifying a second PRS bandwidth in the first downlink subframe of the plurality of downlink subframes as being within a second subset of the wideband system bandwidth.

16. The method of claim 1, further comprising:
    identifying, at the narrowband communications device, wireless transmission resources within the narrowband transmission bandwidth for one or more downlink channels;
    receiving, on the one or more downlink channels, one or more downlink signals from one or more transmitters; and
    processing the one or more downlink signals to determine one or more positioning parameters in addition to one or more PRS-based positioning parameters.

17. The method of claim 16, wherein the one or more downlink signals comprises one or more of a primary synchronization signal (PSS), a secondary synchronization signal (SSS), a physical broadcast channel (PBCH) signal, or a system information block (SIB) signal.

18. The method of claim 16, wherein the processing comprises:
    non-coherent combining of the one or more downlink signals with one or more PRS transmissions to determine a power delay profile (PDP).

19. The method of claim 16, wherein the processing comprises:
    weighted combining of two or more PRS-based positioning parameters based at least in part on measurements associated with the one or more downlink signals.

20. The method of claim 16, further comprising:
    determining a first measurement associated with the one or more PRS transmissions;
    determining a second measurement associated with one or more other downlink signals; and
    estimating a position of the narrowband communications device based at least in part on the first measurement and the second measurement.

21. A method for wireless communication, comprising:
    identifying positioning reference signal (PRS) resources within a standalone narrowband transmission bandwidth that is outside of a wideband system bandwidth or in a guard band bandwidth that is adjacent to the wideband system bandwidth;
    generating a PRS based at least in part on the identified PRS resources; and
    transmitting, on the PRS resources within the standalone narrowband transmission bandwidth or the guard band bandwidth, the PRS in at least one downlink subframe among a plurality of downlink subframes, the PRS being transmitted within each of a first through third symbol in time of a resource block (RB) in a first slot in time of the at least one downlink subframe.

22. The method of claim 21, wherein the narrowband transmission bandwidth is a subset of a wideband transmission bandwidth.

23. The method of claim 21, wherein the RB of the narrowband transmission bandwidth does not include a cell-specific reference signal (CRS).

24. The method of claim 21, further comprising:
coordinating with one or more other base stations to mute transmissions of the one or more other base stations during the transmission of the RB.

25. The method of claim 21, wherein a number of consecutive downlink subframes with PRS transmissions is increased relative to a wideband PRS transmission.

26. The method of claim 21, wherein a periodicity of PRS transmissions within the narrowband transmission bandwidth is reduced relative to a wideband PRS transmission periodicity.

27. The method of claim 21, further comprising:
receiving a first measurement associated with the PRS from a user equipment;
receiving a second measurement associated with one or more other downlink channel signals received at the user equipment; and
estimating a position of the user equipment based at least in part on the first measurement and the second measurement.

28. The method of claim 27, wherein the one or more other downlink channel signals comprises one or more of a primary synchronization signal (PSS), a secondary synchronization signal (SSS), a physical broadcast channel (PBCH) signal, or a system information block (SIB) signal.

29. The method of claim 27, wherein the second measurement comprises a power delay profile (PDP) based at least in part on a non-coherent combining of the one or more other downlink channel signals with the PRS transmission.

30. An apparatus for wireless communication comprising:
means for identifying, at a narrowband communications device, positioning reference signal (PRS) resources within a standalone narrowband transmission bandwidth that is outside of a wideband system bandwidth or in a guard band bandwidth that is adjacent to the wideband system bandwidth; and
means for receiving, on the PRS resources within the standalone narrowband transmission bandwidth or the guard band bandwidth, one or more PRS transmissions in at least one downlink subframe among a plurality of downlink subframes, the one or more PRS transmissions being received within each of a first through third symbol in time of a resource block (RB) in a first slot in time of the at least one downlink subframe.

31. An apparatus for wireless communication comprising:
means for identifying positioning reference signal (PRS) resources within a standalone narrowband transmission bandwidth that is outside of a wideband system bandwidth or in a guard band bandwidth that is adjacent to the wideband system bandwidth;
means for generating a PRS based at least in part on the identified PRS resources; and
means for transmitting, on the PRS resources within the standalone narrowband transmission bandwidth or the guard band bandwidth, the PRS in at least one downlink subframe among a plurality of downlink subframes, the PRS being transmitted within each of a first through third symbol in time of a resource block (RB) in a first slot in time of the at least one downlink subframe.

32. An apparatus for wireless communication, comprising:
a processor;
memory in electronic communication with the processor; and
instructions stored in the memory and executable by the processor to cause the apparatus to:
identify, at a narrowband communications device, positioning reference signal (PRS) resources within a standalone narrowband transmission bandwidth that is outside of a wideband system bandwidth or in a guard band bandwidth that is adjacent to the wideband system bandwidth; and
receive, on the PRS resources within the standalone narrowband transmission bandwidth or the guard band bandwidth, one or more PRS transmissions in at least one downlink subframe among a plurality of downlink subframes, the one or more PRS transmissions being received within each of a first through third symbol in time of a resource block (RB) in a first slot in time of the at least one downlink subframe.

33. An apparatus for wireless communication, comprising:
a processor;
memory in electronic communication with the processor; and
instructions stored in the memory and executable by the processor, to cause the apparatus to:
identify positioning reference signal (PRS) resources within a standalone narrowband transmission bandwidth that is outside of a wideband system bandwidth or in a guard band bandwidth that is adjacent to the wideband system bandwidth;
generate a PRS based at least in part on the identified PRS resources; and
transmit, on the PRS resources within the standalone narrowband transmission bandwidth or the guard band bandwidth, the PRS in at least one downlink subframe among a plurality of downlink subframes, the PRS being transmitted within each of a first through third symbol in time of a resource block (RB) in a first slot in time of the at least one downlink subframe.

34. A non-transitory computer-readable medium storing code for wireless communications, the code comprising instructions executable to:
identify, at a narrowband communications device, positioning reference signal (PRS) resources within a standalone narrowband transmission bandwidth that is outside of a wideband system bandwidth or in a guard band bandwidth that is adjacent to the wideband system bandwidth; and
receive, on the PRS resources within the standalone narrowband transmission bandwidth or the guard band bandwidth, one or more PRS transmissions in at least one downlink subframe among a plurality of downlink subframes, the one or more PRS transmissions being received within each of a first through third symbol in time of a resource block (RB) in a first slot in time of the at least one downlink subframe.

35. A non-transitory computer-readable medium storing code for wireless communications, the code comprising instructions executable to:

identify positioning reference signal (PRS) resources within a standalone narrowband transmission bandwidth that is outside of a wideband system bandwidth or in a guard band bandwidth that is adjacent to the wideband system bandwidth;

generate a PRS based at least in part on the identified PRS resources; and transmit, on the PRS resources within the standalone narrowband transmission bandwidth or the guard band bandwidth, the PRS in at least one downlink subframe among a plurality of downlink subframes, the PRS being transmitted within each of a first through third symbol in time of a resource block (RB) in a first slot in time of the at least one downlink subframe.

* * * * *